US012494573B2

(12) United States Patent
Lipworth

(10) Patent No.: US 12,494,573 B2
(45) Date of Patent: *Dec. 9, 2025

(54) BEAMFORMING VIA SPARSE ACTIVATION OF ANTENNA ELEMENTS CONNECTED TO PHASE ADVANCE WAVEGUIDES

(71) Applicant: MetaVC Patent Holding Company, Sisters, OR (US)

(72) Inventor: Guy S. Lipworth, Seattle, WA (US)

(73) Assignee: MetaVC Patent Holding Company, Sisters, OR (US)

( * ) Notice: Subject to any disclaimer, the term of this patent is extended or adjusted under 35 U.S.C. 154(b) by 199 days.

This patent is subject to a terminal disclaimer.

(21) Appl. No.: 18/452,864

(22) Filed: Aug. 21, 2023

(65) Prior Publication Data

US 2024/0047870 A1 Feb. 8, 2024

Related U.S. Application Data

(63) Continuation of application No. 17/933,167, filed on Sep. 19, 2022, now Pat. No. 11,735,817, which is a (Continued)

(51) Int. Cl.
*H01Q 3/24* (2006.01)
*H01Q 13/26* (2006.01)

(52) U.S. Cl.
CPC ............... *H01Q 3/24* (2013.01); *H01Q 13/26* (2013.01)

(58) Field of Classification Search
CPC .......... H01Q 3/24; H01Q 3/2658; H01Q 3/28; H01Q 3/46; H01Q 21/005; H01Q 21/0062; H01Q 21/065
See application file for complete search history.

(56) References Cited

U.S. PATENT DOCUMENTS 10,224,979 B1 3/2019 Hunter
2004/0095288 A1 5/2004 Jackson
(Continued)

FOREIGN PATENT DOCUMENTS

WO 2021202028 A1 10/2021

OTHER PUBLICATIONS

Michael Boyarsky et al., Single-frequency 3D synthetic aperture imaging with dynamic metasurface antennas, vol. 57, No. 15, May 20, 2018, Applied Optics, pp. 4123-4134, p. 4124, left column, lines 1-10.
(Continued)

*Primary Examiner* — Daniel Munoz
(74) *Attorney, Agent, or Firm* — PCFB, LLC; Justin K. Flanagan

(57) ABSTRACT

Systems and methods described herein include a two-dimensional antenna array of antenna pixels having length and width dimensions of less than one-half of an operational wavelength. In various examples, each antenna pixel comprises a fixed number of phase-adjustable antenna elements. The antenna elements of each antenna pixel may be coupled to the waveguide with interelement spacings selected to associate each antenna element with a distinct phase advance value. A controller identifies a target phase value for each antenna pixel that corresponds to a target beamform for the two-dimensional antenna. A controller activates and adjusts a phase response of one of the antenna elements in each antenna pixel, such that the phase advance value associate with the activated antenna element and the adjusted phase response combine to attain the target phase value for the antenna pixel as a whole.

24 Claims, 18 Drawing Sheets

Related U.S. Application Data continuation of application No. 16/837,998, filed on Apr. 1, 2020, now Pat. No. 11,450,954.

(56) References Cited

U.S. PATENT DOCUMENTS

| | | | | |
|---|---|---|---|---|
| 2016/0141754 | A1 | 5/2016 | Leyh | |
| 2017/0201018 | A1 | 7/2017 | Nikitin | |
| 2019/0140350 | A1* | 5/2019 | Urzhumov | H04B 1/00 |
| 2019/0356060 | A1 | 11/2019 | Daniel | |
| 2021/0118828 | A1 | 4/2021 | Franson | |
| 2021/0296783 | A1 | 9/2021 | Rostomyan | |
| 2021/0313683 | A1 | 10/2021 | Lipworth | |
| 2023/0155283 | A1 | 5/2023 | Lipworth | |

OTHER PUBLICATIONS

Daniel Rodrigo, Reconfigurable Pixel Antennas for Communications, Apr. 2013, p. 6, fig. 1.4, 1.5.
ELWHA, LLC, International Application No. PCT/US2021/020402, International Search Report mailed Jun. 10, 2021, 3 pp.
ELWHA, LLC, international Application No. PCT/US2021/020402, Written Opinion mailed Jun. 10, 2021, 4 pp.
U.S. Appl. No. 16/837,998, Non-Final Office Action mailed Feb. 24, 2022, 9 pp.
U.S. Appl. No. 17/933,167, Notice of Allowance mailed Apr. 5, 2023, 9 pp.

* cited by examiner

300

BEAMFORMING VIA SPARSE ACTIVATION OF ANTENNA ELEMENTS CONNECTED TO PHASE ADVANCE WAVEGUIDES

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc., applications of such applications are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority applications"), if any, listed below (e.g., claims earliest available priority dates for other than provisional patent applications or claims benefits under 35 U.S.C. § 119(e) for provisional patent applications, and for any and all parent, grandparent, great-grandparent, etc., applications of the Priority Application(s)). In addition, the present application is related to the "Related Applications," if any, listed below.

PRIORITY APPLICATIONS

This application is a continuation of U.S. Non-Provisional patent application Ser. No. 17/933,167, titled "Beamforming Via Sparse Activation of Antenna Elements Connected to Phase Advance Waveguides," filed on Sep. 19 2022, which is a continuation of U.S. Non-Provisional patent application Ser. No. 16/837,998, titled "Beamforming Via Sparse Activation of Antenna Elements Connected to Phase Advance Waveguides," filed on Apr. 1, 2020 and issued on Sep. 20, 2022 as U.S. Pat. No. 11,450,954, both of which are hereby incorporated by reference in their entireties.

RELATED APPLICATIONS

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc., applications of the Priority Applications and the Related Applications, including any priority claims, is incorporated herein by reference to the extent such subject matter is not inconsistent herewith.

TECHNICAL FIELD

This disclosure relates to reconfigurable antenna technology. Specifically, this disclosure relates to reconfigurable and tunable antennas with subwavelength antenna element spacings.

DETAILED DESCRIPTION

Figure 1:
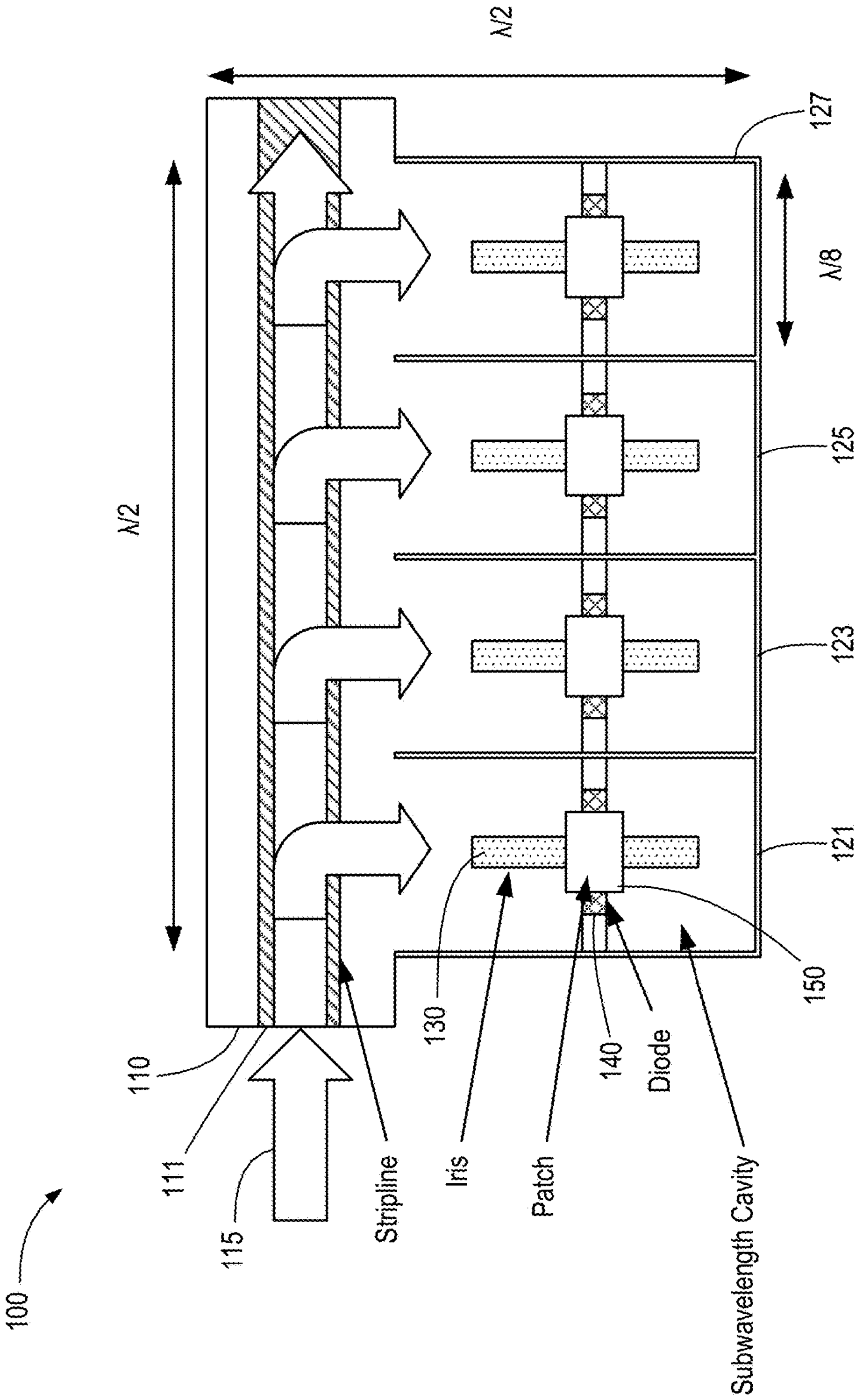
FIG. 1 illustrates an example of an antenna pixel with four antenna elements connected to a waveguide.

This application is related to various metamaterial-surface antenna technology (MSAT) antennas and other antenna arrays utilizing antenna elements with subwavelength spacing. As an example, tunable leaky-wave MSAT or MSAT-like antenna architectures may utilize any number of antenna elements having subwavelength spacings. Phase characteristics and/or the magnitudes of the individual antenna elements may be selectively adjusted to generate a target beamform. At a high level of abstraction, the steering capabilities and/or the beam shaping characteristics of the antenna may be a function of the number and/or density of the individual antenna elements.

In some embodiments, individual antenna elements may have subwavelength interelement spacings. For example, individual antenna elements may have interelement spacings of less than one-half of the operational wavelength (λ/2). The interelement spacings may be, for example, one-fourth of the operational wavelength (λ/4), one-sixth of the operational wavelength (λ/6), one-tenth of the operational wavelength (λ/10), etc. Mathematical models and simulations may be utilized to determine the tuning characteristics (e.g., phase and amplitude) that should be applied to each subwavelength antenna element to achieve a given beamform. However, the activation and tuning of multiple antenna elements within a region having dimensions of less than one-half of an operational wavelength may result in significant cross-coupling between antenna elements.

The cross-coupling of closely spaced antenna elements can render mathematically calculated patterns (e.g., calculated naïve holograms), simulation results, and the like inaccurate. To address this, many subwavelength antenna element arrays utilize optimization techniques to improve beamforming accuracy and precision. For example, a controller may implement beamforming optimization in real-time during operation and/or prior to operation to create lookup tables or other databases associating various antenna element phase patterns with corresponding beamforms.

According to various embodiments of the presently described systems and methods, a reconfigurable antenna may include a plurality of antenna pixels that each include multiple phase-adjustable antenna elements coupled to a common waveguide. The waveguide (e.g., waveguide section) of each antenna pixel has a relative permittivity the provides a target phase advance across the length thereof. In various embodiments, each antenna pixel may comprise multiple discrete waveguides. For example, the antenna pixel may include a number of discrete waveguides corresponding to the number of unique antenna pixels. In other embodiments, the waveguide of each antenna pixel may be a waveguide section or portion of a common waveguide that is shared by multiple antenna pixels.

The phase advance characteristics of the waveguide of each antenna pixel and the interelement spacing of the antenna elements of each antenna pixel are configured to provide each of the antenna elements with a distinct phase advance value. As a specific example, the waveguide of each antenna pixel may provide a phase advance of 360 degrees along the length thereof with four antenna elements connected thereto. The antenna elements may be positioned along the waveguide with interelement spacings corresponding to incremental phase advance values of 90 degrees. For instance, the four antenna elements may be spaced to have phase advance values of 0 degrees, 90 degrees, 180 degrees, and 270 degrees. Alternatively, the four antenna elements may be evenly or unevenly spaced to have alternative phase advance values. Each of the antenna elements may have 90-degrees of phase adjustability. For instance, each of the antenna elements may be phase-adjustable between −45 degrees and +45 degrees.

A controller, such as a beamforming controller, may identify a target phase value for each antenna pixel in the reconfigurable antenna. The target phase values for each antenna pixel may be selected to generate a target beamform for transmitting and/or receiving electromagnetic radiation. As described above, each antenna element within a given antenna pixel is associated with a distinct phase advance relative to the other antenna elements. Accordingly, one of the antenna elements within each antenna pixel will be associated with a phase advance that approximates (e.g., closest to) the target phase value for the given antenna pixel.

The controller may activate the antenna element in each antenna pixel identified as having a phase advance closest to the target phase value of each respective antenna pixel. The phase advance associated with each activated antenna element of each antenna pixel may not exactly match the target phase value of each respective antenna pixel. Accordingly, the controller may adjust the phase of each of the activated (phase-adjustable) antenna elements to correspond to (e.g., be equal to, approximate, or more closely approximate) the identified target phase value for each respective antenna pixel.

In the specific example provided above, the waveguide of each antenna pixel provides a phase advance of 360 degrees along the length thereof with four antenna elements connected thereto. It is appreciated that alternative antenna designs may utilize a wide variety of phase advances and/or specific numbers of antenna elements. Antenna designs that utilize a number, N, of antenna elements that are associated with incremental phase advances and are each phase-adjustable with a range sufficient to allow for the antenna pixel to exhibit any target phase value (e.g., 0 degrees to 360 degrees). In other designs, one or more of the antenna pixels may not be fully adjustable between 0 degrees and 360 degrees. For example, each antenna pixel may only have a phase adjustability of 180 degrees, 270 degrees, 300 degrees, or other range less than a full 360 degrees.

In some embodiments, each antenna pixel may be described as having a length, L. The relative permittivity of the waveguide of each respective antenna pixel may be described as providing a phase advance of P degrees across the length L. A number of antenna elements N may be arranged along the length L of the waveguide. In some examples, the antenna elements may be evenly spaced along the length L of the waveguide such that the antenna pixels have interelement spacing corresponding to phase advances of P/N degrees. In other embodiments, the antenna elements may be unevenly spaced. For example, if the waveguide provides a phase advance of fewer than 360 degrees (e.g., 270 degrees), individual antenna elements may be spaced to provide the antenna pixel the broadest range of phase control given the phase-adjustability of the individual antenna elements.

For example, if the waveguide provides a phase advance of 270 degrees across the length L of an antenna pixel that includes three antenna elements, the antenna elements might be, for example, located positions corresponding to phase advance values of 80 degrees, 170 degrees, and 270 degrees. Assuming the antenna elements have a phase adjustability of −90 degrees and +90 degrees, the antenna pixel can be adjusted between 0 degrees and 360 degrees, with overlapping tunability between −10 degrees and 0 degrees.

Returning to the generalized example above, each of the N antenna elements in each respective antenna pixel is phase-adjustable between −(P/(2N) degrees and +(P/(2N) degrees. Antenna pixels with less phase-adjustability may provide for limited tunability and/or only allow for the approximation of a target phase value of each antenna pixel.

To provide another specific example, the waveguide of each antenna pixel may provide a phase advance of 270 degrees across a length thereof. Four antenna pixels may be positioned along the waveguide at positions corresponding to 0 degrees, 90 degrees, 180 degrees, and 270 degrees. The length (or another dimension) of the antenna pixel may correspond to one-half of an operational wavelength of the antenna system. The antenna pixel may be fully adjustable between 0 and 360 degrees through the use of antenna elements that are each phase adjustable between −45 degrees and +45 degrees.

In another embodiment, the waveguide of each antenna pixel may have a relative permittivity to provide a phase advance of 60 degrees between each antenna element. The antenna elements of each respective antenna pixel may be spaced equally along each respective waveguide and have a phase-adjustability of −30 degrees and 30 degrees.

Any of a wide variety of waveguides may be utilized to provide a target phase advance across each antenna pixel. In some examples, the waveguide may include a substrate, such as an RF-35 substrate or an RF-4 substrate. In some embodiments, an air-filled waveguide may be utilized. In some embodiments, the waveguide may comprise a stripline, such as a metal stripline, a doped semiconductor stripline, a low-loss stripline, or another conductor.

Each antenna pixel may include any number of antenna elements that may all be the same type of antenna element. In other embodiments, each antenna pixel may include a number of different types of antenna elements. Each antenna element may, for example, include a subwavelength cavity with an iris-coupled patch. Each antenna element may include a diode, such as a varactor diode or other type of diode. In such embodiments, a beamforming controller may selectively activate one antenna element and/or adjust the phase of the activated antenna element by selectively transmitting an electrical signal to a diode of such antenna element. For example, a voltage-controlled diode may selectively adjust the phase of the antenna element associated therewith. According to one example, each diode may be electrically connected to a controller (e.g., via traces or vias) to facilitate the application of a selectable voltage bias to the diode. For instance, one side of the diode may be connected to zero volts or ground, while the voltage applied to the other side is varied to attain a target phase response.

In some embodiments, each antenna element may include a microelectromechanical system (MEM) device that is voltage or current controlled to selectively activate and/or adjust the phase response of the antenna element. In some embodiments, each antenna element may include a liquid crystal tunable element that can be used to selectively activate and/or adjust the phase response of the associated antenna element. Combinations of antenna element types and features may be utilized for purposes of activating and/or tuning the phase and/or amplitude response of individual antenna elements.

In one embodiment, each antenna element may include a voltage-controlled element. A controller may selectively activate one of the antenna elements within an antenna pixel. The activated antenna element of each antenna pixel is associated with a phase advance most closely approximating a target phase value for each respective antenna pixel. Each antenna pixel may be associated with one or more tunable elements associated with the set of antenna elements in each respective antenna pixel. The controller may selectively adjust the phase of the activated antenna element via the one or more tunable elements associated with the set of antenna elements.

The antennas and antenna systems described herein may be configured with waveguides and antenna elements for operation within operational wavelengths suitable for and/or to facilitate wireless power transmission, data communication, imaging, radio frequency (RF) illumination, radar applications, and the like. For example, the various embodiments of the antennas and antenna systems described herein may be configured for operation within gigahertz frequencies, terahertz frequencies, or other electromagnetic frequency bands. In a specific example, the operational wavelength may be approximately 1.24 centimeters. The length of each respective waveguide or antenna pixel may be equal to one-half of the operational wavelength and include four antenna elements with interelement spacings of approximately 0.155 centimeters. A waveguide may have an electrical permittivity of 3.5 to provide a target phase advance to each sequential antenna element.

In some embodiments, a two-dimensional antenna may comprise an array of antenna pixels that each include N phase-adjustable antenna elements, where N is an integer greater than one. One or more waveguides may extend through one or more of the antenna pixels. Each waveguide may have a relative permittivity that provides a phase advance across each antenna pixel to provide antenna pixels connected thereto with distinct phase advance values. A beamforming controller may identify a target phase value for each antenna pixel that corresponds to a target beamform for the two-dimensional antenna. The controller may activate and adjust a phase response of one antenna element within each antenna pixel to selectively attain the target phase values.

The various antenna pixels may be square or elongated and may be equally or unequally spaced from one another. In some embodiments, the waveguides may be arranged as a plurality of parallel elongated waveguides. A set of phase-adjustable antenna elements may be coupled along the length of each of the elongated waveguides with interelement spacings to associate each antenna element with a distinct phase advance value. The parallel elongated waveguides may each be connected to one or more adjacent elongated waveguide with a phase advance component to provide a specific phase advance between adjacent parallel elongated waveguides.

Some of the infrastructure that can be used with embodiments disclosed herein is already available, such as general-purpose computers, computer programming tools and techniques, digital storage media, and communication links. Any of the systems, subsystems, modules, components, and the like that are described herein may be implemented as hardware, firmware, and/or software. Various systems, subsystems, modules, and components are described in terms of the function(s) they perform because such a wide variety of possible implementations exist. For example, it is appreciated that many existing programming languages, hardware devices, frequency bands, circuits, software platforms, networking infrastructures, and/or data stores may be utilized alone or in combination to implement a specific control function.

It is also appreciated that two or more of the elements, devices, systems, subsystems, components, modules, etc. that are described herein may be combined as a single element, device, system, subsystem, module, or component. Moreover, many of the elements, devices, systems, subsystems, components, and modules may be duplicated or further divided into discrete elements, devices, systems, subsystems, components, or modules to perform subtasks of those described herein. Any of the embodiments described herein may be combined with any combination of other embodiments described herein. The various permutations and combinations of embodiments are contemplated to the extent that they do not contradict one another.

As used herein, a computing device, system, subsystem, module, or controller may include a processor, such as a microprocessor, a microcontroller, logic circuitry, or the like. A processor may include one or more special-purpose processing devices, such as application-specific integrated circuits (ASICs), a programmable array logic (PAL), a programmable logic array (PLA), a programmable logic device (PLD), a field-programmable gate array (FPGA), or another customizable and/or programmable device. The computing device may also include a machine-readable storage device, such as non-volatile memory, static RAM, dynamic RAM, ROM, CD-ROM, disk, tape, magnetic, optical, flash memory, or another machine-readable storage medium. Various aspects of certain embodiments may be implemented using hardware, software, firmware, or a combination thereof.

The components of some of the disclosed embodiments are described and illustrated in the figures herein. Many portions thereof could be arranged and designed in a wide variety of different configurations. Furthermore, the features, structures, and operations associated with one embodiment may be applied to or combined with the features, structures, or operations described in conjunction with another embodiment. In many instances, well-known structures, materials, or operations are not shown or described in detail to avoid obscuring aspects of this disclosure. The right to add any described embodiment or feature to any one of the figures and/or as a new figure is explicitly reserved.

The embodiments of the systems and methods provided within this disclosure are not intended to limit the scope of the disclosure but are merely representative of possible embodiments. In addition, the steps of a method do not necessarily need to be executed in any specific order, or even sequentially, nor do the steps need to be executed only once. As previously noted, descriptions and variations described in terms of transmitters are equally applicable to receivers, and vice versa.

FIG. 1 illustrates an example antenna pixel 100 with four antenna elements 121, 123, 125, and 127 connected to a waveguide 110. In the illustrated embodiment, the waveguide 110 of the antenna pixel 100 includes a stripline 111. A signal 115 is directed to each of the antenna elements 121, 123, 125, and 127 via the stripline 111 within the waveguide 110. According to various embodiments, the electrical permittivity of the waveguide 110 and/or stripline 111 are selected to provide an incremental phase advance to each antenna element 121, 123, 125, and 127. In the illustrated embodiment, each of the antenna elements comprises a cavity with subwavelength dimensions, an iris 130, a diode 140, and a patch 150.

In the illustrated embodiment, the antenna pixel 100 has a length dimension of approximately $\lambda/2$, where $\lambda$ is an operational wavelength of an antenna system of which the antenna pixel 100 is a part. Each of the antenna elements 121, 123, 125, and 127 has a dimension of approximately $\lambda/8$, such that four antenna elements are coupled to the waveguide 110. A controller may be in communication with each of the antenna elements 121, 123, 125, and 127. Specifically, the controller may selectively transmit a control signal to one of the diodes 140 of one of the antenna elements 121, 123, 125 and 127 to selectively activate one of the antenna elements 121, 123, 125 and 127 and/or adjust a phase response thereof.

In some examples, the waveguide 110 may include a substrate, such as an RF-35 substrate with an electrical permittivity of approximately 3.5. The substrate may produce a phase advance in the stripline of −90 degrees across a distance of $\lambda/8$, such that each antenna element 121, 123, 125, and 127 experiences incremental phase advances of −90 degrees. Each of the antenna pixels may allow for 90 degrees of phase control (e.g., −45 degrees to +45 degrees), such that, when combined with the phase advance experienced by each successive antenna element, the antenna pixel 100 can produce any phase response between 0 degrees and 360 degrees (a $2\pi$ phase range) by activating and adjusting one of the antenna elements 121, 123, 125, and 127 while the others remain inactive.

As discussed above, an antenna may comprise a plurality of antenna pixels that each have a length less than $\lambda/2$ and enable a full $2\pi$ phase range. In alternative embodiments, an antenna system may include antenna pixels that have a length greater than $\lambda/2$ and/or enable a phase range of less than a full $2\pi$. Such embodiments may provide reduced beamforming and/or steerability as compared to embodiments utilizing antenna elements with sub-$\lambda/2$ dimensions and/or reduced phase adjustability.

Figure 2A:
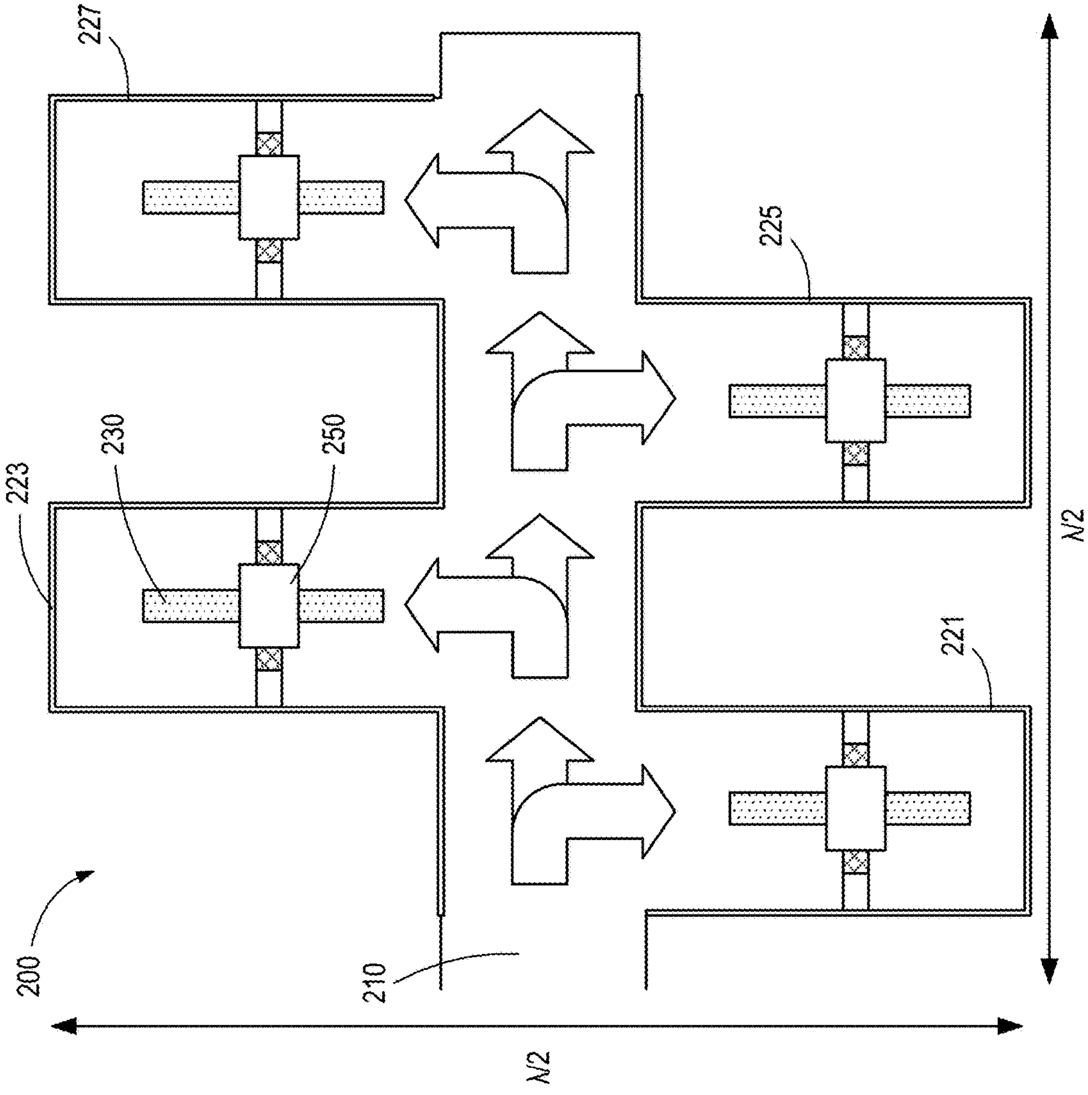
FIG. 2A illustrates an example antenna pixel with four antenna elements extending from a waveguide in alternating directions.

FIG. 2A illustrates an example antenna pixel 200 with four antenna elements 221, 223, 225, and 227 extending from a waveguide 210 in alternating directions. The illustrated arrangement spatially separates the antenna elements 221, 223, 225, and 227 to avoid or reduce cross-coupling therebetween. Each of the antenna elements 221, 223, 225, and 227 includes a cavity connected to the waveguide 210, an iris 230, and a patch 250. Each of the antenna elements 221, 223, 225, and 227 may also include a diode. A controller may selectively activate one of the antenna elements 221, 223, 225, and 227 by transmitting a control signal to the diode thereof. As described herein, the waveguide 210 may produce a phase advance across the length of the antenna pixel 200, and each antenna element 221, 223, 225, and 227 may be phase-adjustable by, for example, the controller varying the voltage applied to the diode thereof.

Figure 2B:
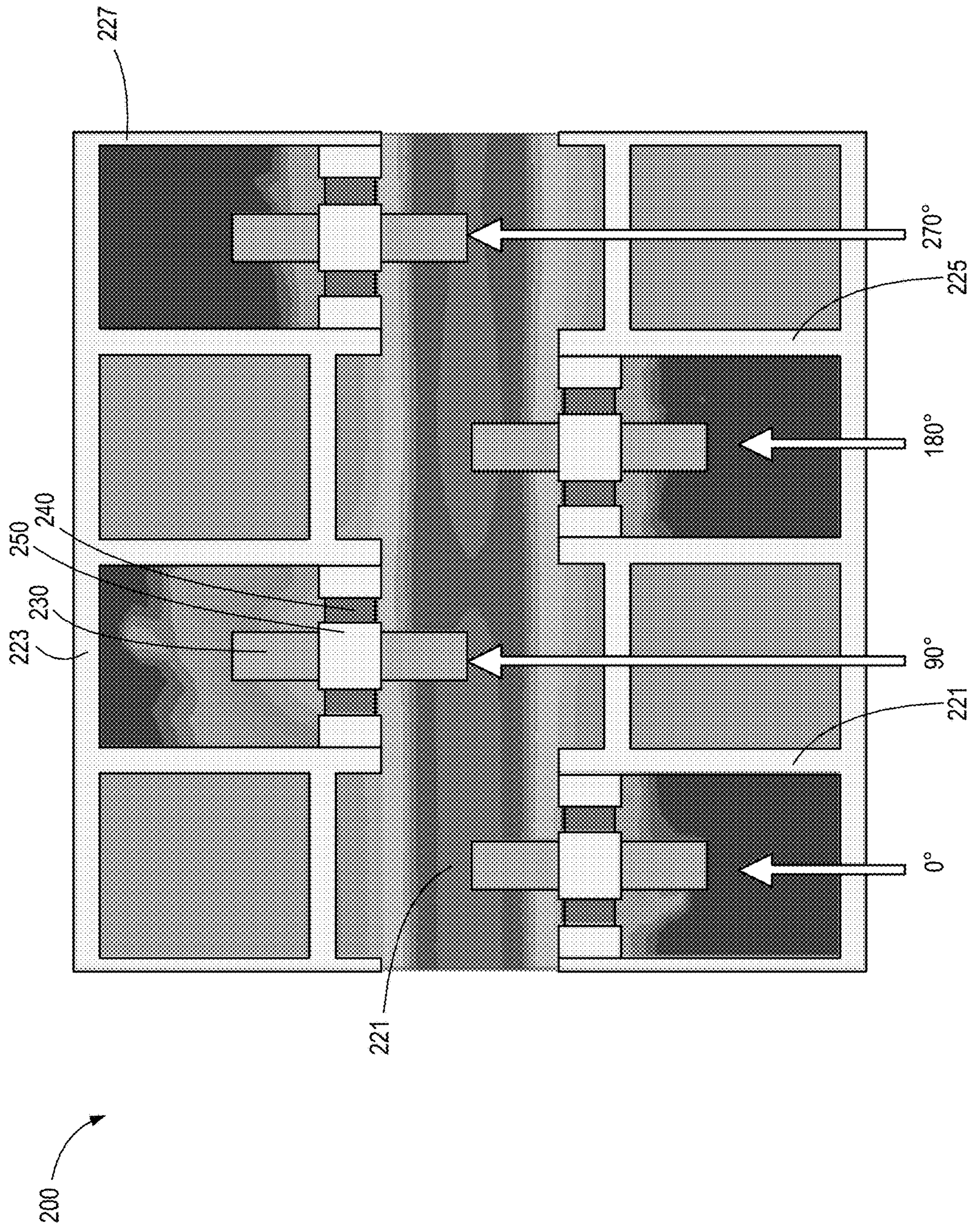
FIG. 2B illustrates a simulation of the example antenna pixel of FIG. 2A illustrating the relative phase advance of a signal along the waveguide and the relative field strength of each antenna element in greyscale.

FIG. 2B illustrates a simulation of the example antenna pixel 200 of FIG. 2A with a phase advance of 360 degrees across the entire antenna pixel 200. The arrows illustrate the relative phase advance seen by each respective antenna element moving from left to right beginning with 0 degrees and ending at 270 degrees. The relative field strength of each antenna element 221, 223, 225, and 227 is illustrated in greyscale. In the illustrated example, the waveguide produces a relative phase advance of 0 degrees at the first antenna element 221, a relative phase advance of 90 degrees at the second antenna element 223, a relative phase advance of 180 degrees at the third antenna element 225, and a relative phase advance of 270 degrees at the fourth antenna element. As previously described, each of the antenna elements 221, 223, 225, and 227 may provide 90 degrees of phase adjustability. In the illustrated simulation, the second antenna element 223 is activated and phase-adjusted to operate at the phase advance of 90 degrees, adjusted by 45 degrees in either direction (e.g., 45 degrees to 135 degrees).

Figure 2D:
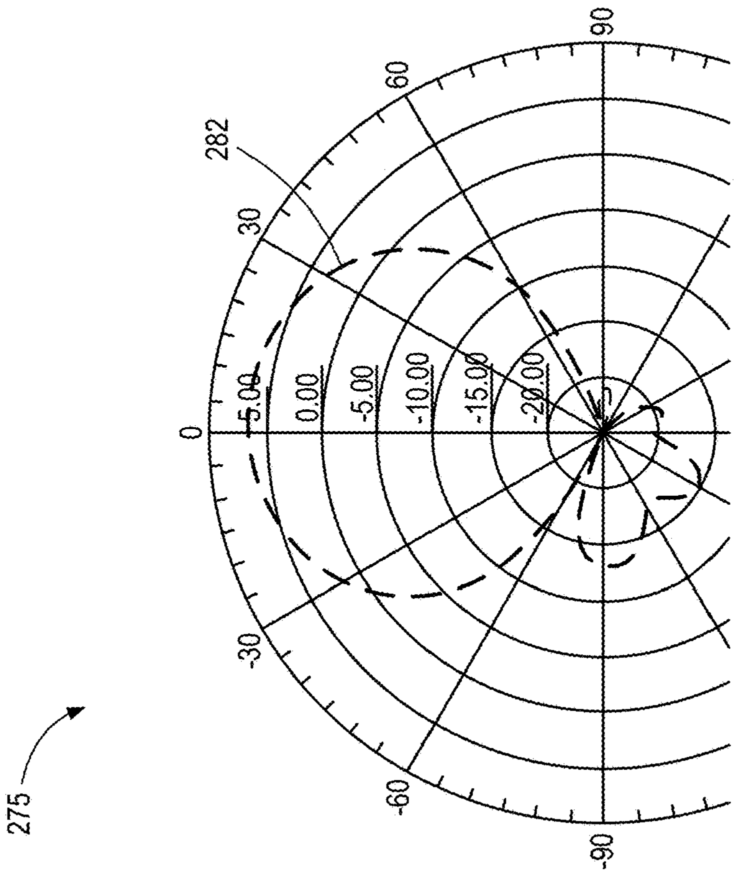
FIG. 2D illustrates an example graph of a beamform formed by the selective activation of one antenna element within each antenna pixel.
Figure 2C:
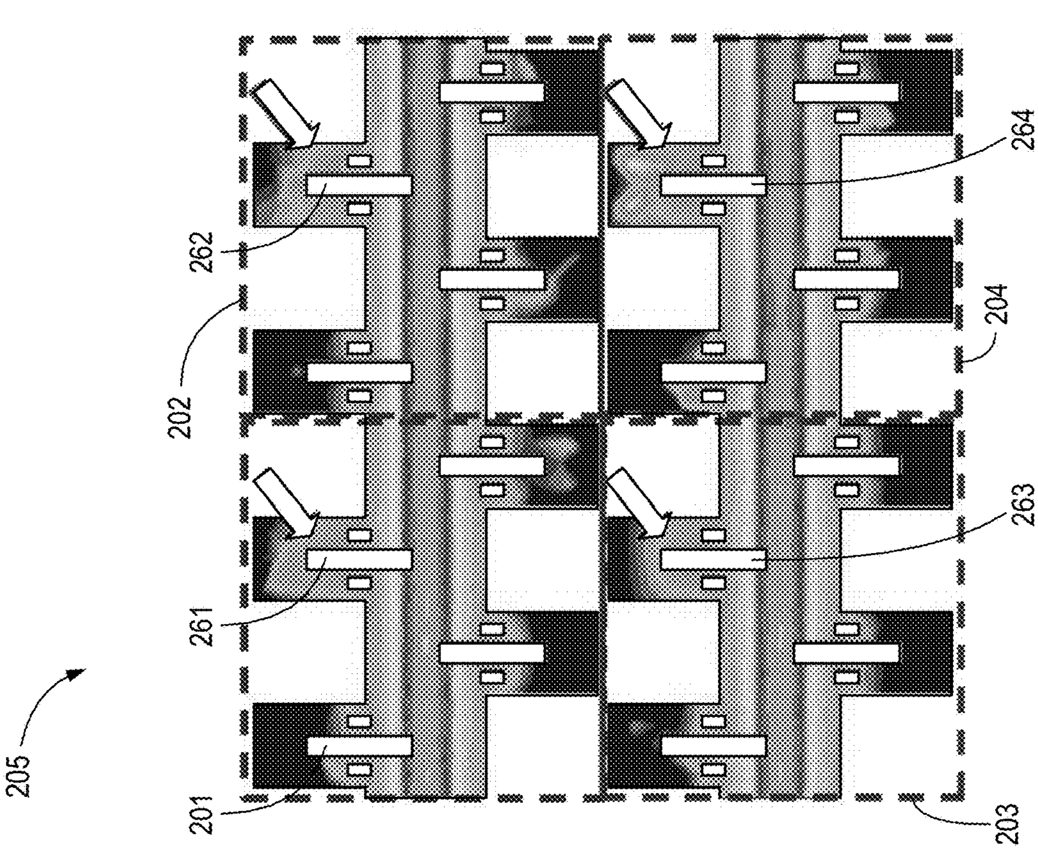
FIG. 2C illustrates an example four-pixel antenna with one antenna element activated within each antenna pixel.

FIG. 2C illustrates an example of an antenna 205 with four antenna pixels 201, 202, 203, and 204. One antenna element 261, 262, 263, and 264 is activated in each antenna pixel 201, 202, 203, and 204, respectively, as shown by a white arrow.

FIG. 2D illustrates an example graph 275 of a simulated beamform 282 formed by the selective activation of the one antenna element 261, 262, 263, and 264 within each antenna pixel 201, 202, 203, and 204.

Figure 3:
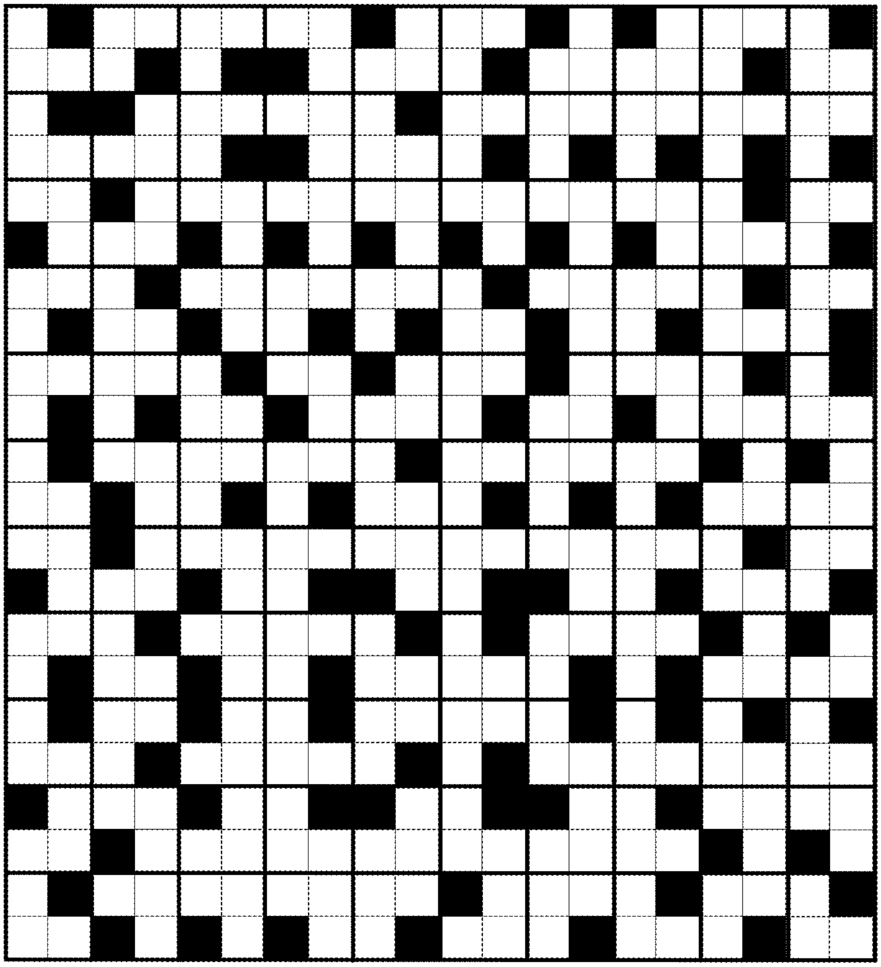
FIG. 3 illustrates an example of a reconfigurable antenna with one antenna element activated within each antenna pixel.

FIG. 3 illustrates an example of a reconfigurable antenna 300 at a high level of abstraction. In the illustrated example, the reconfigurable antenna 300 includes 110 antenna pixels (11 antenna pixels wide and ten antenna pixels tall). Each antenna pixel is shown with four antenna elements (shown as boxes), one of which is activated (shown as a black box). A controller may determine a target pattern of phase values for the antenna pixels to generate a target beamform. The controller selectively activates one antenna element within each antenna pixel, to the exclusion of the others, and selectively adjusts (e.g., tunes) the phase of each activated antenna element to attain the target pattern of phase values.

In alternative embodiments, each antenna pixel may include only three antenna elements instead of four. In still other embodiments, each antenna pixel may include more than four antenna elements. In some embodiments, each antenna pixel may comprise a physically discrete component relative to each other antenna pixel. The discrete antenna pixels may be joined together and connected to a controller to form a functional antenna system. In other embodiments, an array of antenna elements may be conceptually divided up into a plurality of antenna pixels with dimensions of, for example, λ/2 or less. The controller may then selectively activate one of the antenna elements within each antenna pixel to generate a target beamform with reduced or eliminated cross-coupling between activated antenna elements.

Figure 4A:
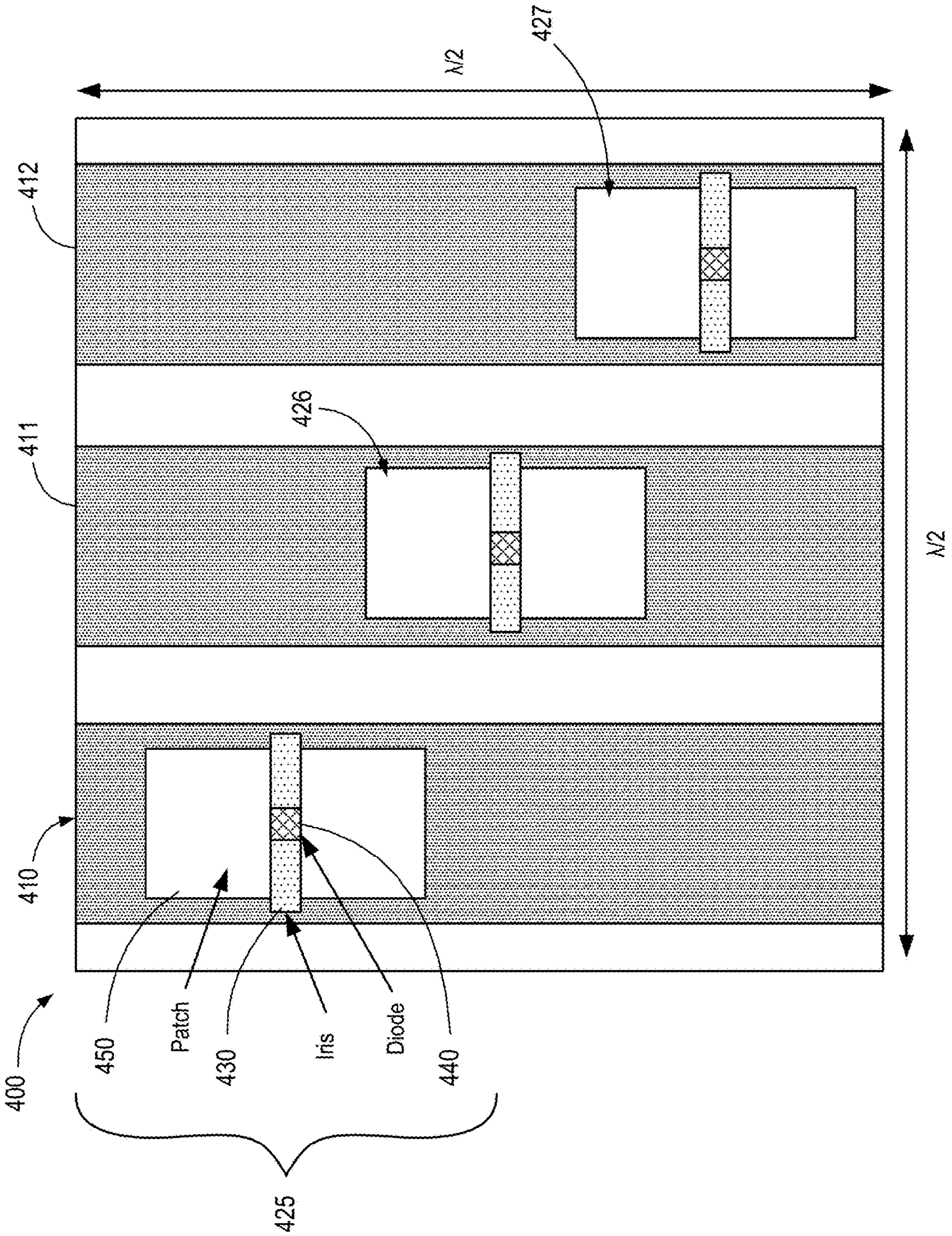
FIG. 4A illustrates a top view of an example antenna pixel with three antenna elements extending from a waveguide.

FIG. 4A illustrates a top view of an example antenna pixel 400 with three antenna elements 425, 426, and 427 extending from a waveguide stripline 410, 411, and 412. The antenna pixel 400 may have length and width dimensions of approximately λ/2. Each antenna element 425, 426, and 427 may include an iris 430, a diode 440, and a patch 450. In various embodiments, the waveguide stripline 410, 411, and 412 may comprise a low-loss stripline, a substrate material, and/or an air-filled waveguide.

Each of the antenna elements 425, 426, and 427 may be associated with a different phase advance and have limited or partial phase-adjustability. Collectively, however, the antenna pixel 400 may have a full 2π phase range even though each antenna element 425, 426, and 427 has access to only a portion of the 2π phase range (e.g., 2/3π each).

Figure 4B:
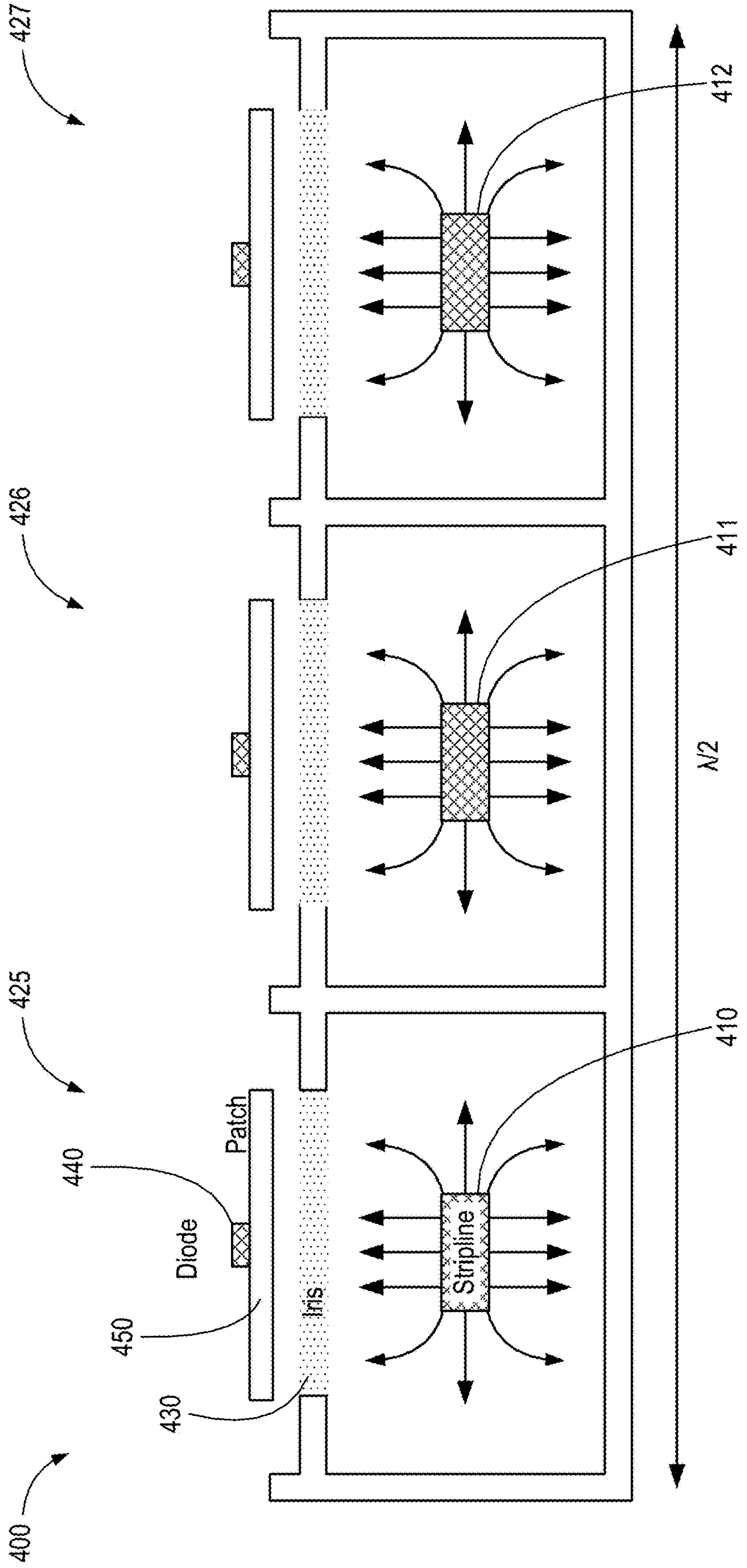
FIG. 4B illustrates a cross-sectional view of the example antenna pixel of FIG. 4A.

FIG. 4B illustrates a cross-sectional view of the example antenna pixel 400 of FIG. 4A. Again, the antenna pixel 400 includes three antenna elements 425, 426, and 427. Each antenna element 425, 426, and 427 includes a waveguide stripline 410, 411, and 412 to excite the iris 430 and patch 450 of each respective antenna element 425, 426, and 427 with different phase advances. A voltage-controlled diode 440 of each respective antenna element 425, 426, and 427 can be adjusted to provide a target phase response.

Figure 4C:
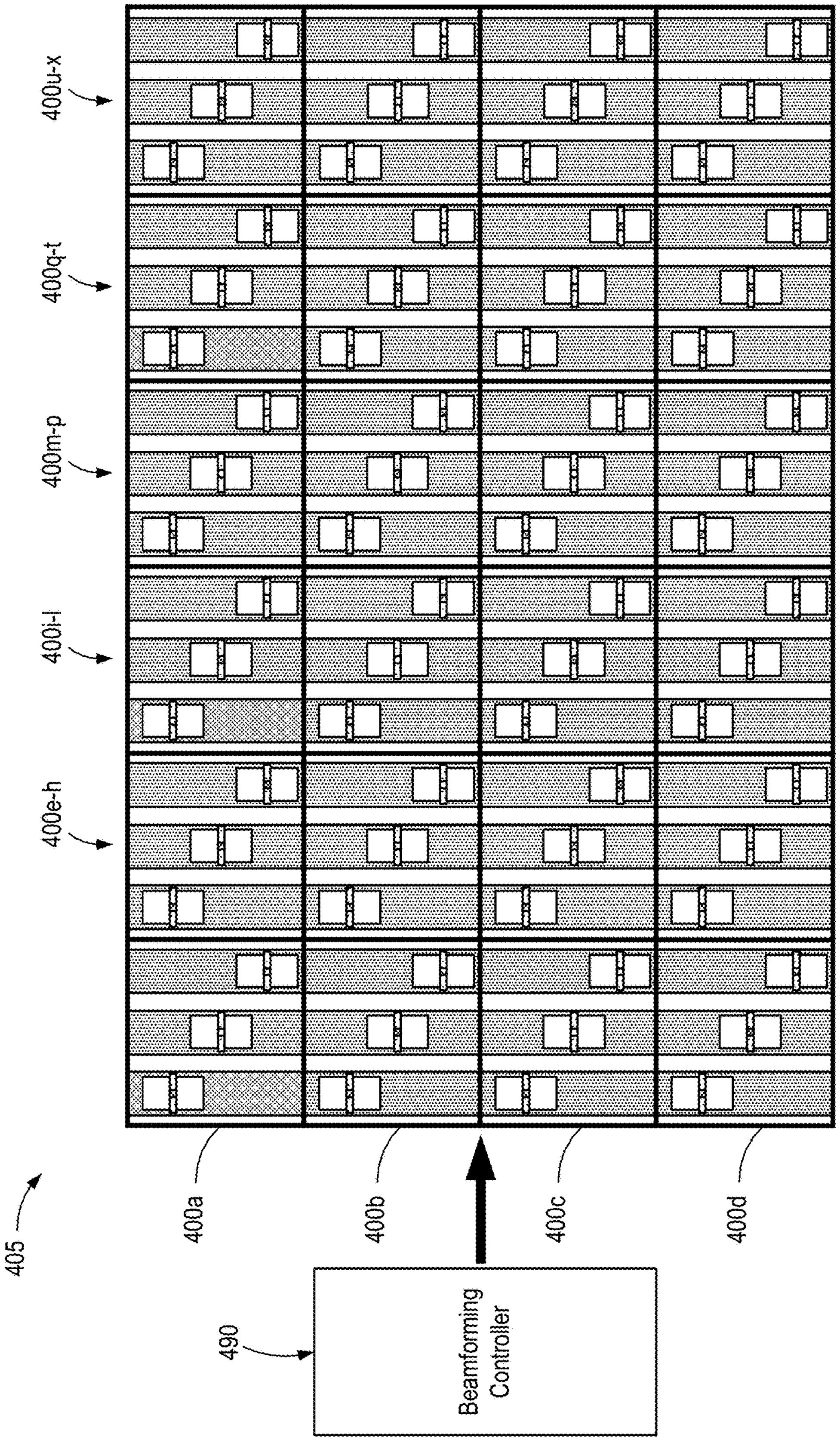
FIG. 4C illustrates an example antenna array using the antenna pixel illustrated in FIG. 4A with a beamforming controller.

FIG. 4C illustrates an example antenna system 405 with a two-dimensional antenna array of the antenna pixel illustrated in FIG. 4A with a beamforming controller 490 connected thereto. The antenna array includes a 4×6 array of antenna pixels 400, shown as a first column of antenna pixels 400*a*-400*d*, a second column of antenna pixels 400*e*-*h*, a third column of antenna pixels 400*i*-*l*, a fourth column of antenna pixels 400*m*-*p*, a fifth column of antenna pixels 400*q*-*t*, and a sixth column of antenna pixels 400*u*-*x*.

The beamforming controller 490, may identify a target phase value for each antenna pixel 400*a*-*x* in the antenna system 405. The target phase values for each antenna pixel 400*a*-*x* may be selected to generate a target beamform for transmitting and/or receiving electromagnetic radiation. Each of the antenna elements (425, 426, and 427 in FIGS. 4A and 4B) within a given antenna pixel 400*a*-*x* is associated with a distinct phase advance relative to the other antenna elements. Accordingly, one of the antenna elements within each antenna pixel 400*a*-*x* will be associated with a phase advance that most closely approximates the target phase value for the given antenna pixel 400*a*-*x*.

The beamforming controller 490 may activate one individual antenna element within each antenna pixel 400*a*-*x* identified as having a phase advance closest to the target phase value of each respective antenna pixel 400*a*-*x*. The phase advance associated with each activated antenna element of each antenna pixel 400*a*-*x* may not exactly match the target phase value of each respective antenna pixel 400*a*-*x*. However, the beamforming controller 490 may adjust the phase of each of the activated (phase-adjustable) antenna elements to correspond to (e.g., be equal to, approximate, or more closely approximate) the identified target phase value for each respective antenna pixel 400*a*-*x*.

Figure 5A:
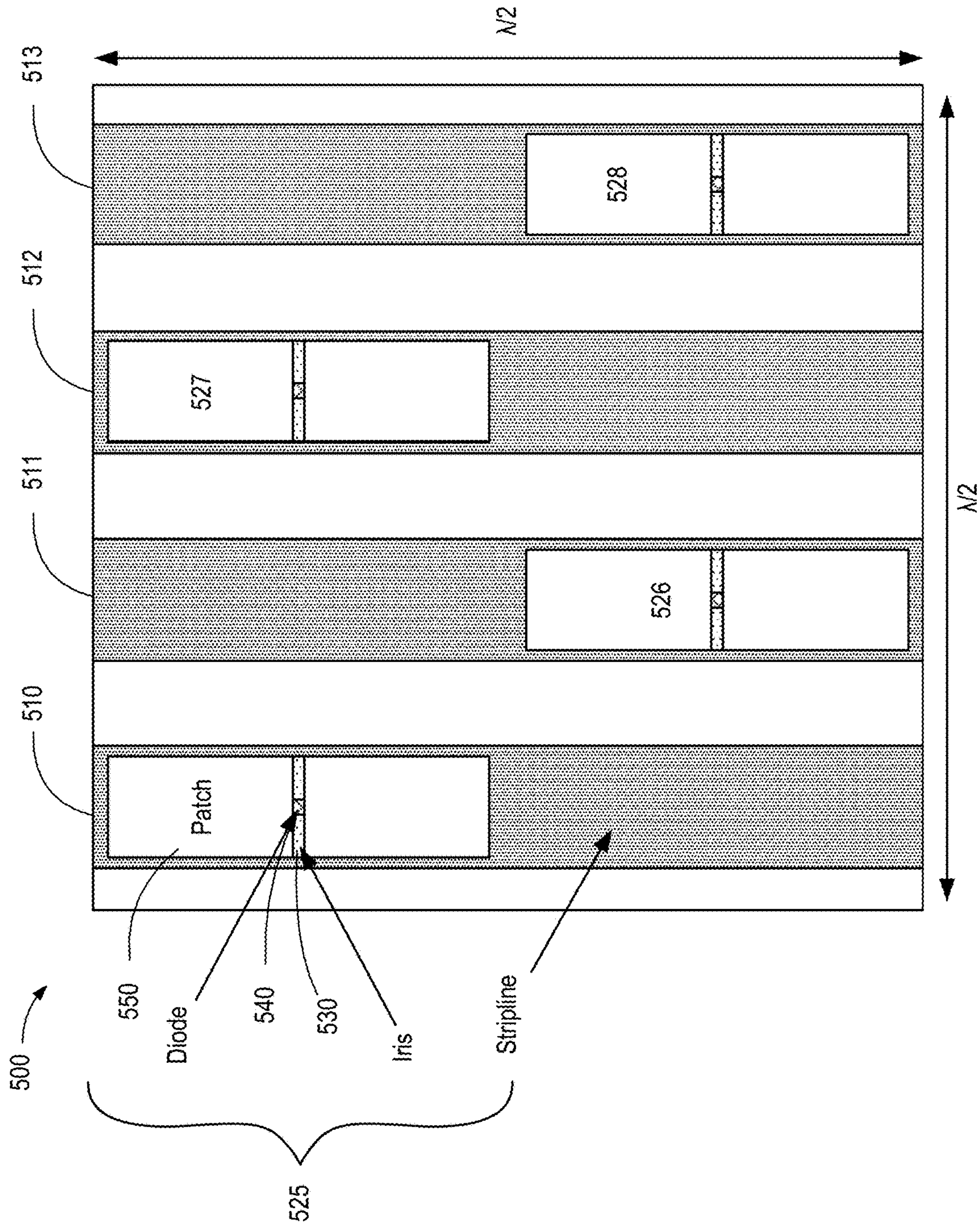
FIG. 5A illustrates a top view of an example antenna pixel with four offset antenna elements extending from a waveguide.

FIG. 5A illustrates a top view of an example antenna pixel 500 with four offset antenna elements 525, 526, 527, and 528 associated with a waveguide or sections of waveguides (illustrated as pattern-filled striplines) 510, 511, 512, and 513. As explicitly labeled for antenna element 525, each of the antenna elements 525, 526, 527, and 528 includes an iris 530, a diode 540, and a patch 550. While many of the illustrated examples include patch-and-iris antenna elements with diodes for activation, it is appreciated that any of a wide variety of alternative types of antenna elements may be utilized, as described herein. A controller may activate one of the staggered antenna elements 525, 526, 527, and 528 and/or phase-tune one of the staggered antenna elements 525, 526, 527, and 528 to have a particular phase response. The staggered layout provides increased spatial separation to reduce or eliminate cross-coupling between an activated and phase-tuned antenna element and adjacent un-activated or inactive antenna element.

As in other embodiments, each of the antenna elements 525, 526, 527, and 528 may be associated with a different phase advance and have limited phase-adjustability. Collectively, however, the antenna pixel 500 may have a full 2π phase range even though each antenna element 525, 526, 527, and 528 has access to only a portion of the 2π phase range (e.g., each antenna element 525, 526, and 527 may have a phase adjustability of 1/2π or 90 degrees).

As previously described, a similar configuration may also be used in a system that provides the antenna pixel 500 with less than the full tunability of a 2π phase range. For example, each of the antenna elements 525, 526, 527, and 528 may only offer phase tunability between −30 degrees and +30 degrees, in which case the maximum tunability of the antenna pixel 500 would be 240 degrees. The specific range of tunability depends on the physical spacing of the antenna elements 525, 526, 527, and 528 and/or the phase advance provided to each individual antenna element 525, 526, 527, and 528.

Figure 5B:
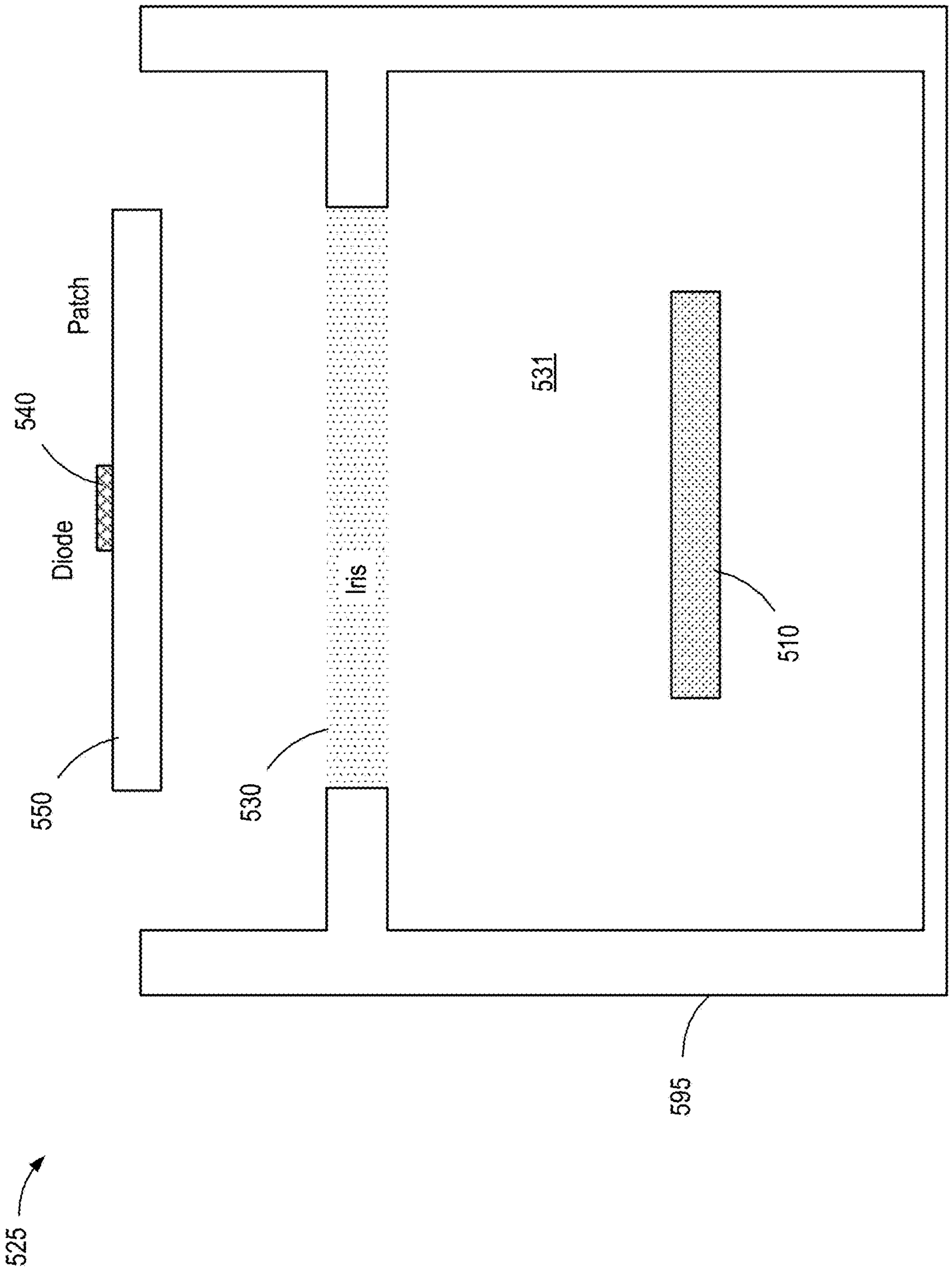
FIG. 5B illustrates an example cross-sectional view of a single antenna element of the antenna pixel of FIG. 5A.

FIG. 5B illustrates a cross-sectional view of one antenna element 525 of the example antenna pixel 500 of FIG. 5A. In the illustrated example, a wall, such as a via fence in a printed circuit board (PCB) 595, may form a waveguide that includes a stripline 510. The region 531 may comprise an air-filled gap or a substrate material, according to various embodiments. The phase-adjustable antenna element 525 includes an iris 530, diode 540, and contact patch 550. A voltage bias applied to the diode 540 activates and controls the overall phase response of the antenna element 525.

Figure 5C:
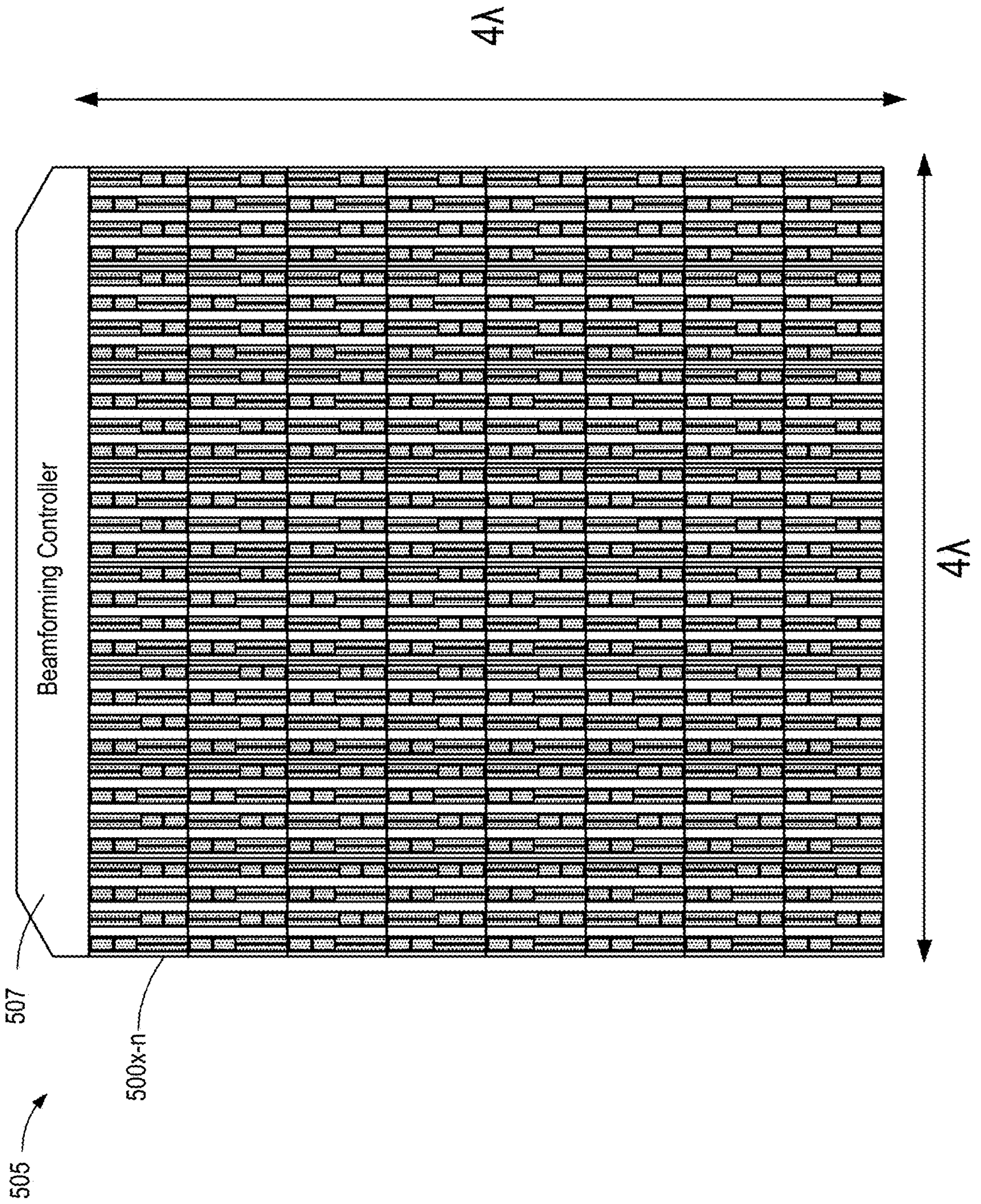
FIG. 5C illustrates an example antenna array using the antenna pixel illustrated in FIG. 5A.

FIG. 5C illustrates an antenna system 505 with an example 8×8 antenna array 500*x*-*n* of antenna pixels, such as the antenna pixel 500 illustrated in FIG. 5A. Each of the antenna pixels may include four antenna elements similar to the antenna element 525 illustrated in FIG. 5B. As illustrated, the antenna elements within each antenna pixel may be offset with respect to one another and with respect to the antenna elements of adjacent antenna pixels.

A beamforming controller 507 may receive, calculate, determine, or otherwise identify a target phase value for each antenna pixel 500 in the array 500*x-n* of antenna pixels. The pattern of target phase values for the array 500*x-n* of antenna elements corresponds to a target beamform of electromagnetic radiation for an operating wavelength or range of wavelengths. The controller may activate the antenna element within each antenna pixel that is associated with a phase advance that most closely approximates the target phase value for each given antenna pixel. The other antenna elements in each antenna pixel may remain deactivated. The controller may adjust the phase of the activated antenna element to deviate from the phase advance value to a phase value more closely approximating the target phase value for each respective antenna pixel.

Figure 6A:
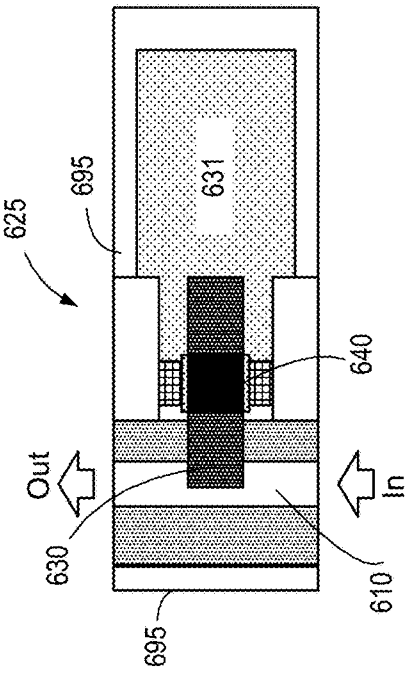
FIG. 6A illustrates a block diagram of a top view of an example cavity-based antenna element.

FIG. 6A illustrates a block diagram of a top view of an example cavity-based antenna element 625. As illustrated, the antenna element may include a stripline 610 within a waveguide adjacent to a cavity 631 bounded by walls 695. The antenna element 625 includes an iris 630 and a voltage-controlled diode 640.

Figure 6B:
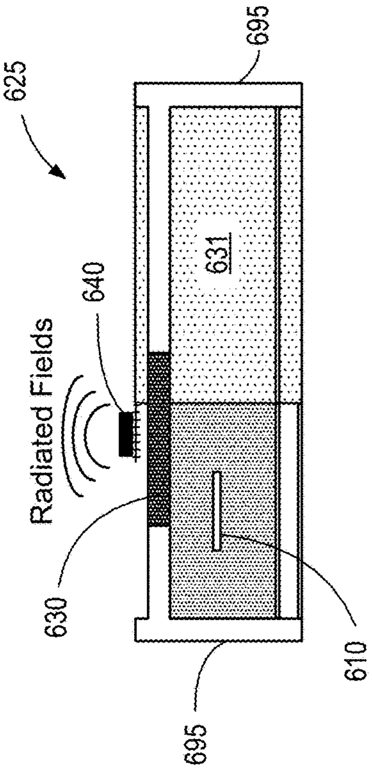
FIG. 6B illustrates a block diagram of a cross-sectional view of the example cavity-based antenna element.

FIG. 6B illustrates a block diagram of a cross-sectional view of the example cavity-based antenna element 625. The illustrated example shows the stripline 610 within a waveguide bounded by walls 695. A cavity 631 adjacent to the stripline 610 may comprise, for example, PCB material and be excited by the stripline 610 when the diode 640 is activated. Electromagnetic radiation radiates through the iris 630 and out of the antenna element 625 when the diode 640 is activated. A controller may adjust a voltage applied to the diode 640 to attain a target phase of the emitted electromagnetic radiation.

Figure 6C:
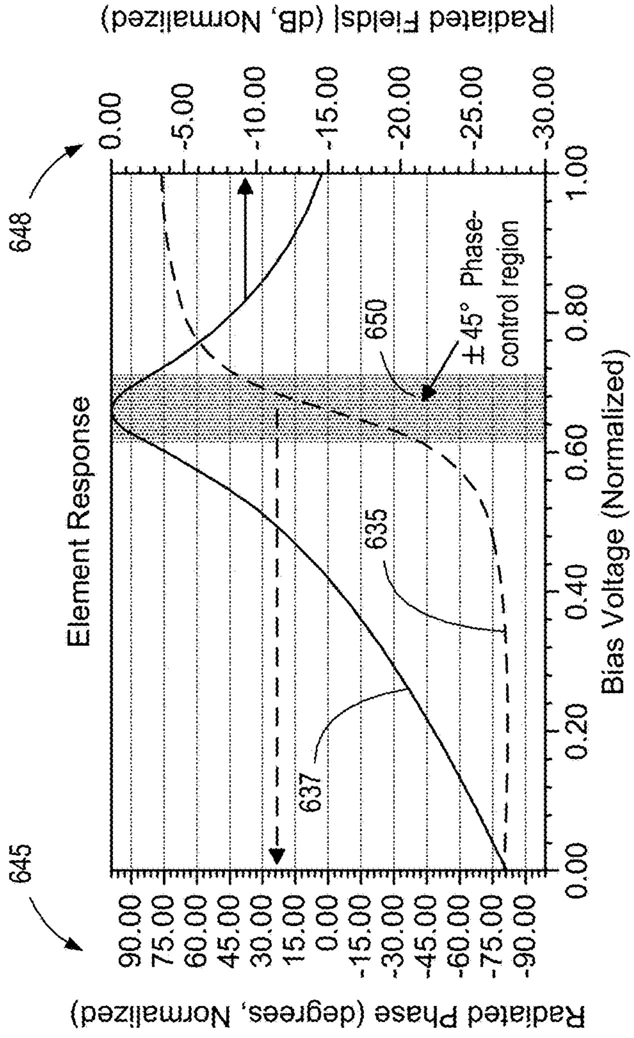
FIG. 6C illustrates a graph of the phase control region of an example antenna element that is tunable between −45 degrees and +45 degrees.

FIG. 6C illustrates a graph of the phase control region of an example antenna element that is tunable between −45 degrees and +45 degrees. The left vertical axis 645 corresponds to the radiated phase output of the antenna element with respect to the normalized voltage bias shown on the x-axis. The radiated phase output is graphed using a dashed line 635. The right vertical axis 648 corresponds to the relative strength of the radiated field relative to the normalized voltage bias on the x-axis and is graphed using a solid line 637.

With zero volts applied to the tunable element (e.g., a diode) of the antenna element, the output strength of the antenna element is very low (e.g., approximately −27 dB, as shown on the right vertical axis 648). At approximately 0.65 volts, the output strength of the antenna element peaks and has a phase offset of approximately zero degrees, as shown on the left vertical axis 645. The output strength remains relatively high between approximately 0.61 volts and 0.71 volts while exhibiting a phase variation between −45 degrees and +45 degrees. This is illustrated on the graph as a shadowed 45-degree phase control region 650.

Alternative embodiments may utilize voltage variations between, for example, 0.63 volts and 0.67 volts for a more even output strength with a smaller range of phase control. Different configurations, sizes of cavities, patch materials, diode types, and other variations in the specific antenna element may be utilized to modify the exact amplitude and phase characteristics relative to the voltage input. For example, a different configuration may use a voltage-controlled diode with an adjustable phase response between −30 degrees and 30 degrees for applied voltages between 2 and 3 volts. As another example, tunable elements such as mems devices, varactor diodes, liquid crystal tunable elements, and the like may be utilized that have different phase and amplitude responses.

An antenna pixel (such as any of the various antenna pixels described herein) may include multiple antenna elements with a response similar (e.g., identical or a variation thereof) to that shown in FIG. 6C. Each of the antenna elements within the antenna pixel may be associated with a different phase advance. A controller may identify a target phase value for the antenna pixel and identify which of the antenna elements is associate with a phase advance closest to the target phase value. The controller may activate the identified antenna element by applying a voltage bias. The voltage may be varied to select a specific phase shift relative to the base phase—i.e., the phase advance provided by the waveguide. In alternative embodiments, a current may be used to adjust the phase of the antenna element.

Figure 7A:
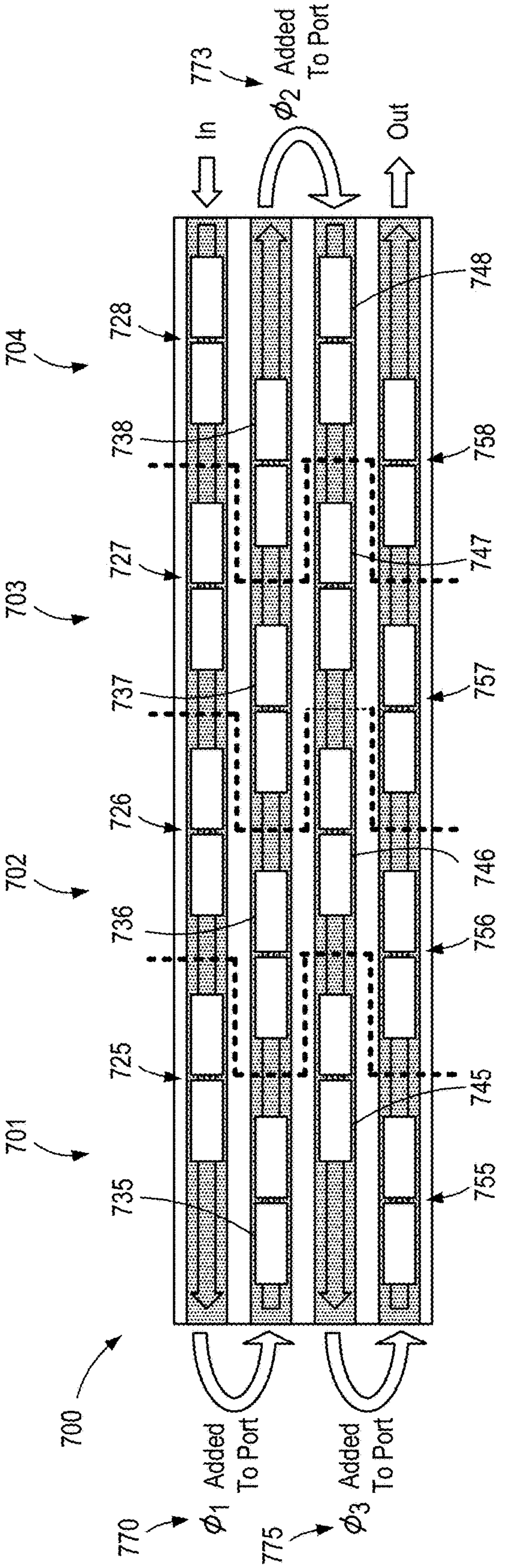
FIG. 7A illustrates a portion of an example antenna with four parallel elongated waveguides with phase-adjustable antenna elements coupled thereto.

FIG. 7A illustrates a portion of an example antenna 700 with four parallel elongated waveguides with phase-adjustable antenna elements 725-758 coupled thereto. As in various embodiments described herein, each of the antenna elements 725-758 may be associated with a specific phase advance provided by the waveguide. Each of the antenna elements 725-758 may be phase adjustable within a range of phases. Each row of antenna elements may contribute one antenna element to an antenna pixel. In the illustrated example, the antenna elements in each row are offset from those in the adjacent row. In the illustrated example, a first antenna pixel 701 includes antenna elements 725, 735, 745, and 755. A second antenna pixel 702 includes antenna elements 726, 736, 746, and 756. A third antenna pixel includes antenna elements 727, 737, 747, and 757. A fourth antenna pixel includes antenna elements 728, 738, 748, and 758. A controller may activate and adjust the phase response of one of the antenna elements in each antenna pixel 701-704 to select a phase value for each respective antenna pixel. Any number of rows and columns of parallel elongated waveguides may be combined to form antennas of varying sizes for different applications, beamforming capabilities, and steerability.

As illustrated, multiple parallel elongated waveguides may be connected to the same source and/or detector. The parallel elongated waveguides may be connected via ports 770, 773, and 775 with defined phase shifts to ensure that each subsequent row of antenna elements is provided with the correct phase advance.

Figure 7B:
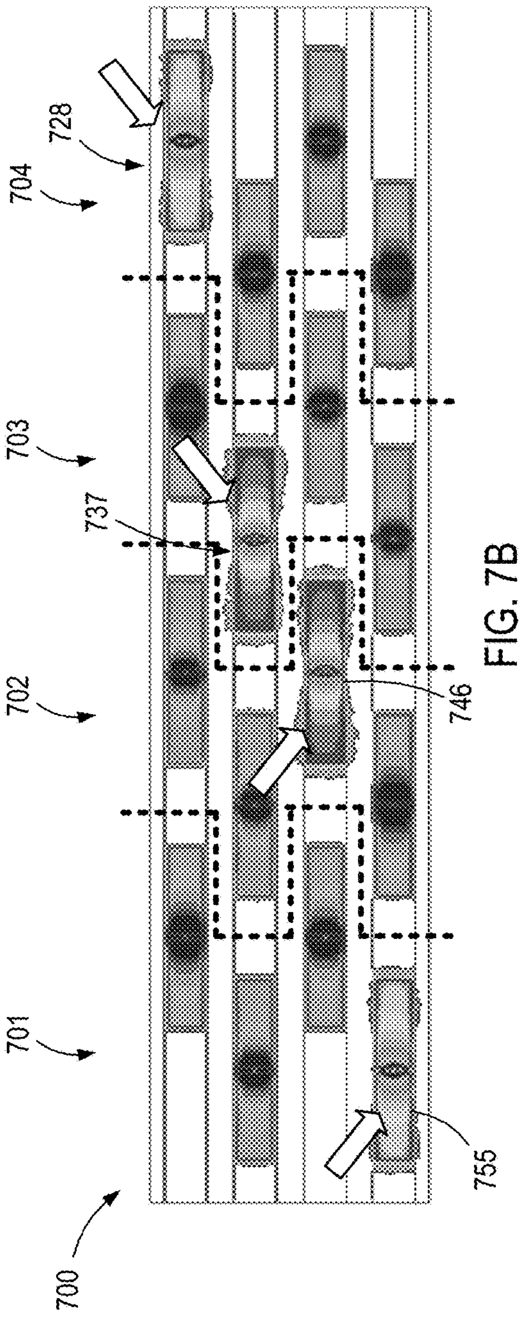
FIG. 7B illustrates a simulated activation and phase adjustment of one antenna element in each antenna pixel.

FIG. 7B illustrates a simulated activation and phase adjustment of one antenna element 728, 737, 746, and 755 in each antenna pixel 701, 702, 703, and 704 of the example antenna 700. A controller may tune each of the activated antenna elements to have a phase response approximating a target phase value for each respective antenna pixel.

Figure 8:
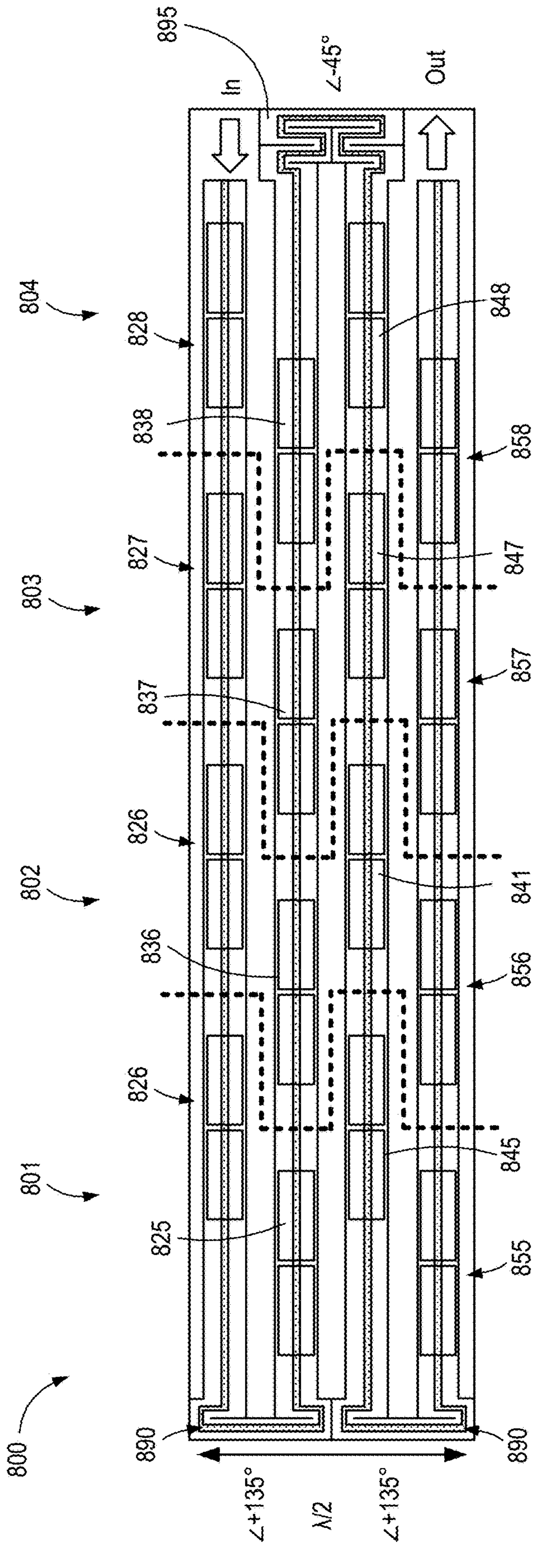
FIG. 8 illustrates a portion of an example antenna with four parallel elongated waveguides connected with meandering turns with phase-adjustable antenna elements coupled thereto.

FIG. 8 illustrates a portion of an example antenna 800 with four parallel elongated waveguides connected with meandering turns with phase-adjustable antenna elements that provide the defined phase shifts described in conjunction with FIG. 7A. Antenna elements 825-858 are connected to the four parallel elongated waveguides to form four distinct antenna pixels 801, 802, 803, and 804 (shown divided by dashed lines).

The four parallel elongated waveguides are connected via meandering turns that provide a specific phase advance to the adjacent waveguide section. In the illustrated example, each of the meandering turns 890 provides 135 degrees of relative phase shift, while meandering turn 895 provides −45 degrees of relative phase shift. The specific examples are merely illustrative, and it is appreciated that variations may be utilized for a specific application to attain any desired or target phase advance between adjacent waveguides.

Figure 9:
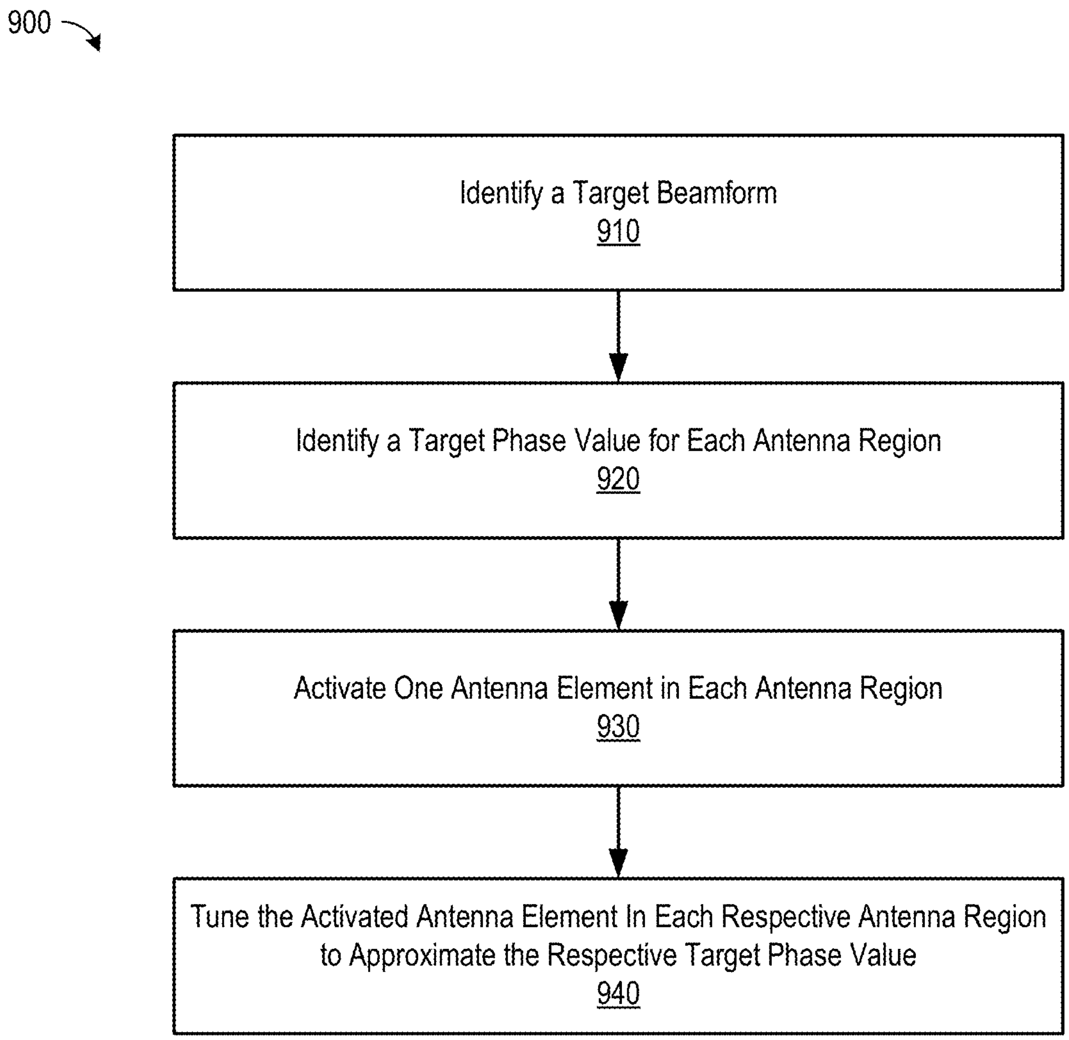
FIG. 9 illustrates a flowchart of an example method of beamforming by activating one antenna element within each subwavelength antenna region.

FIG. 9 illustrates a flowchart of an example method 900 of beamforming by activating one antenna element within each subwavelength antenna region (e.g., antenna pixel). A controller may identify, at 910, a target beamform. The controller may identify, at 920, a target phase value for each antenna region of an antenna array. The controller may activate, at 930, one antenna element in each antenna region and then tune, at 940, the activated antenna element in each respective antenna region to approximate the respective target phase value.

Figure 10:
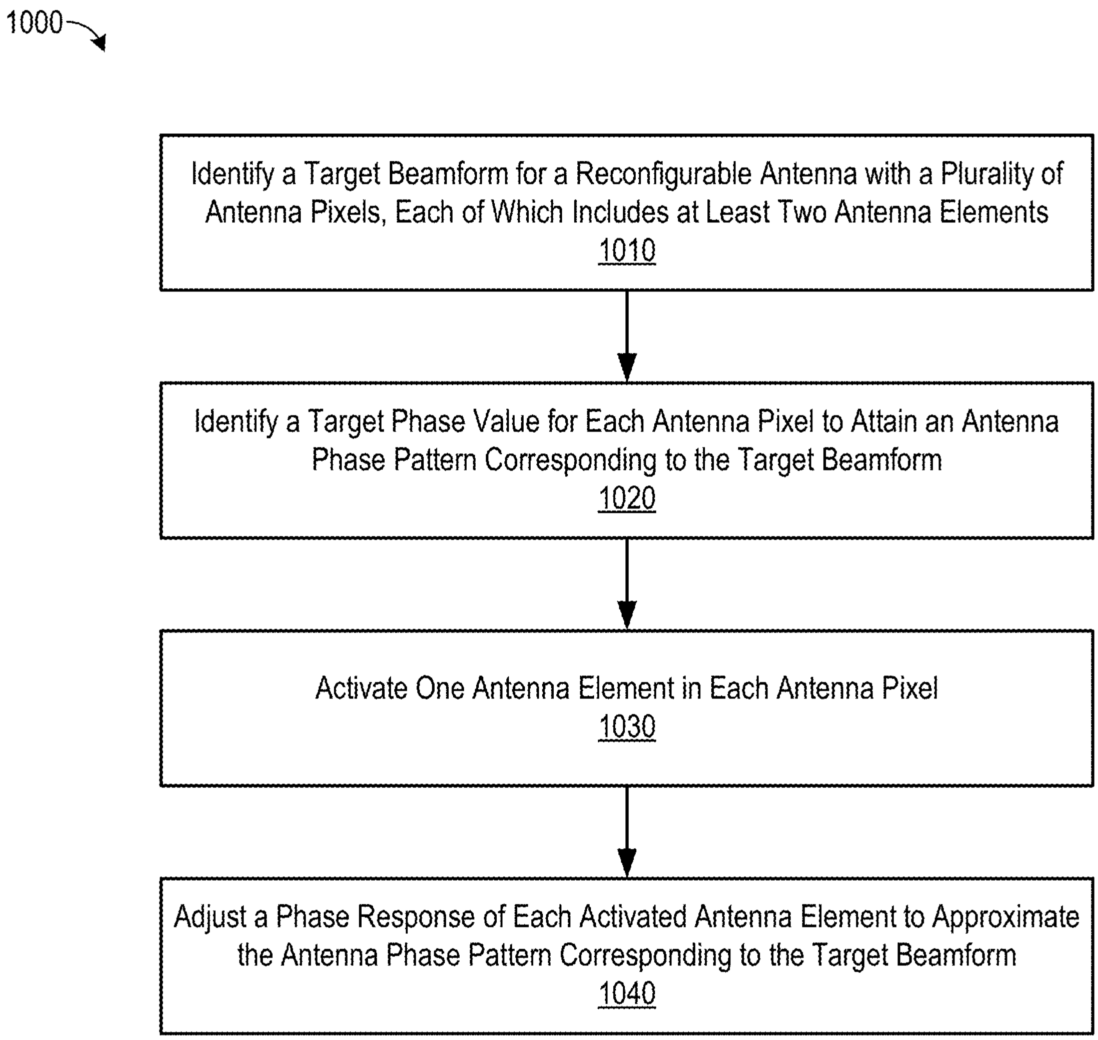
FIG. 10 illustrates a flowchart of an example method of beamforming by selectively activating one antenna element within each one-half wavelength region of an array of subwavelength-spaced antenna elements.

FIG. 10 illustrates a flowchart of an example method 1000 of beamforming by selectively activating one antenna element within each region of an array of subwavelength-spaced antenna elements. A region of the reconfigurable antenna may define an antenna pixel. For example, the region may define an antenna pixel with a dimension of one-half of an operational wavelength or less to achieve full phase tunability. Other embodiments may utilize antenna pixels with larger sizes with slightly reduced functionality that may be suitable for some applications.

In the specific example described, a controller may identify, at 1010, a target beamform for a reconfigurable antenna with a plurality of antenna pixels, each of which includes at least two antenna elements. The controller may identify, at 1020, a target phase value for each antenna pixel to attain an antenna phase pattern corresponding to the target beamform.

The controller may activate, at 1030, the one antenna element in each antenna pixel that is identified as being associated with a phase advance approximating the target phase value for each respective antenna pixel. The controller may adjust, at 1040, a phase response of each activated antenna element to approximate the antenna phase pattern corresponding to the target beamform. In embodiments in which each antenna pixel includes only two antenna elements, one-half of the antenna elements are activated and phase-adjusted to generate the target beamform. In embodiments in which each antenna pixel includes four antenna elements, one-fourth of the antenna elements are activated and phase-adjusted to generate the target beamform. Similarly, in embodiments in which each antenna pixel includes six antenna elements, one-sixth of the antenna elements are activated and phase-adjusted to generate the target beamform.

Figure 11A:
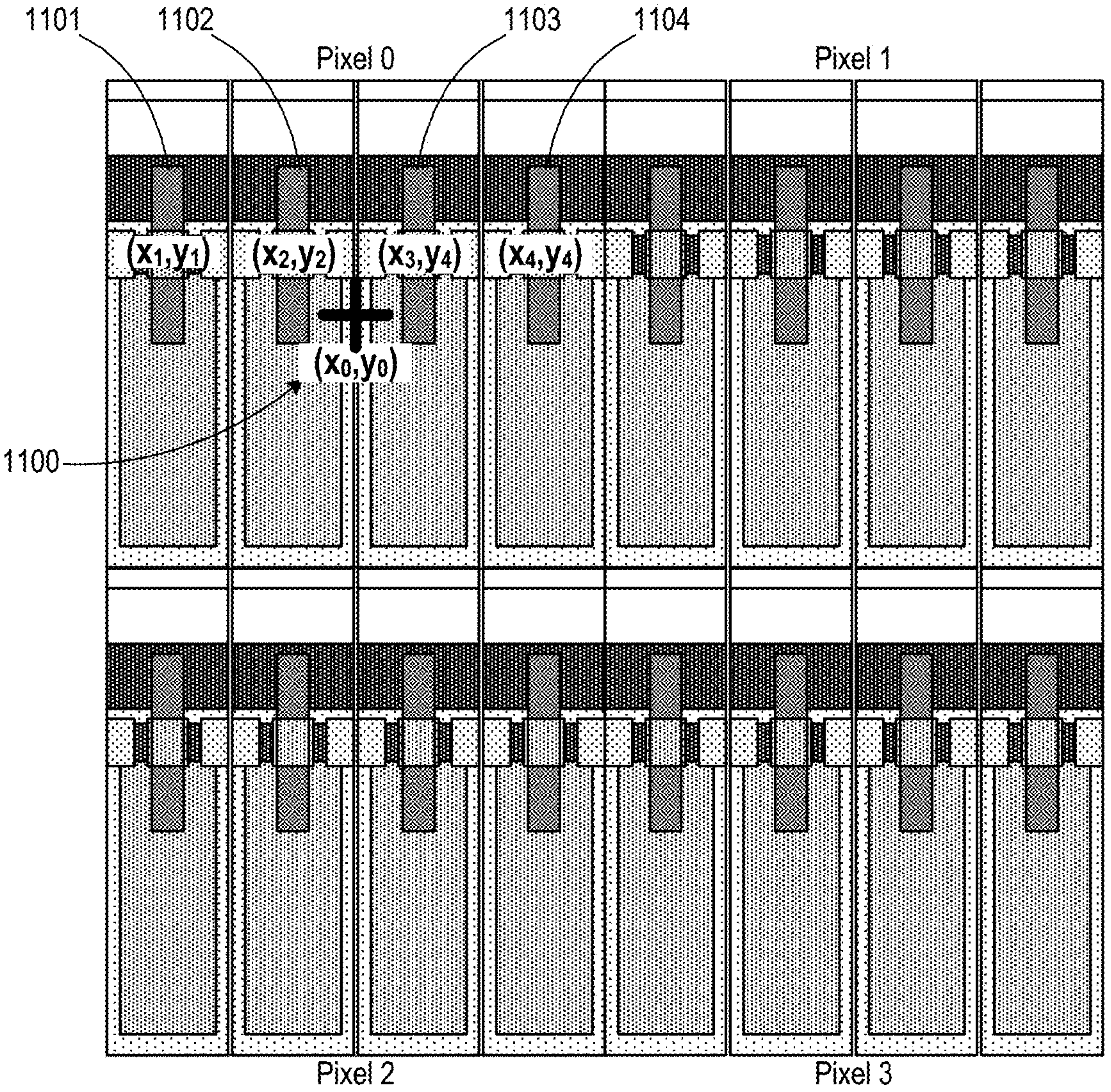
FIG. 11A illustrates a simplified block diagram of four antenna pixels, each of which includes four antenna elements.

FIG. 11A illustrates a simplified block diagram of four antenna pixels, labeled Pixel 0, Pixel 1, Pixel 2, and Pixel 3. Each antenna pixel includes four antenna elements, with the antenna elements 1101, 1102, 1103, and 1104 labeled within Pixel 0. The location at which the first antenna element 1101 radiates electromagnetic radiation can be described in terms of a relative horizontal and vertical displacement, $(X_1, Y_1)$. The location at which the second antenna element 1102 radiates electromagnetic radiation can be described in terms of a relative horizontal and vertical displacement, $(X_2, Y_2)$. The location at which the third antenna element 1103 radiates electromagnetic radiation can be described in terms of a relative horizontal and vertical displacement, $(X_3, Y_3)$. The location at which the fourth antenna element 1104 radiates electromagnetic radiation can be described in terms of a relative horizontal and vertical displacement, $(X_4, Y_4)$. The center location 1100 of the antenna pixel can be described in terms of a relative horizontal and vertical displacement $(X_0, Y_0)$.

Figure 11B:
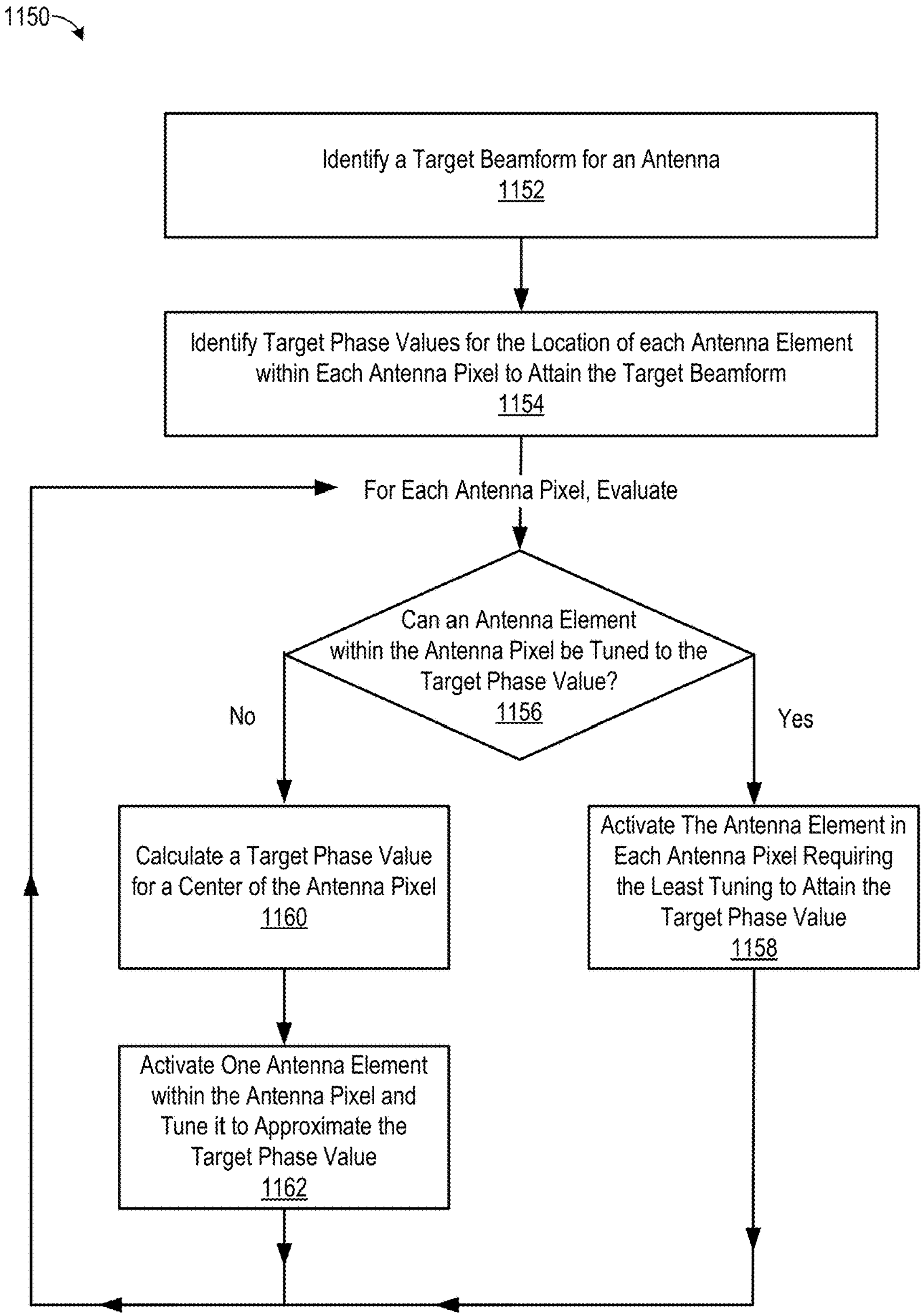
FIG. 11B illustrates a flowchart of an example method of beamforming by activating one antenna element within each antenna pixel, with reference to the antenna element locations shown in FIG. 11A.

FIG. 11B illustrates a flowchart of an example method 1150 of beamforming by activating one antenna element within each antenna pixel, with reference to the antenna element locations and/or the center location 1100 of the antenna pixel shown in FIG. 11A. A system may identify, at 1152, a target beamform for an antenna. The system may identify, at 1154, target phase values for the location of each antenna element within each antenna pixel to attain the target beamform. With reference to FIG. 11A, the system may determine a target phase value for each location $(X_1, Y_1)$, $(X_2, Y_2)$, $(X_3, Y_3)$, and $(X_4, Y_4)$ associated with each of the first, second, third, and fourth antenna elements, respectively. The target phase values for each antenna element within each antenna pixel may vary since they are in slightly different locations in the antenna.

For each antenna pixel, the system may evaluate, at 1156, if any antenna element can be tuned to its unique target phase value. If one or more of the antenna elements can be tuned to its calculated target phase value, the antenna element that requires the least amount of tuning is activated and tuned to attain the target phase value, at 1158. Only one antenna element in each antenna pixel is activated.

If none of the antenna elements in the antenna pixel can be tuned to their unique target phase values, then the system may calculate, at 1160, a target phase value for the center of the antenna pixel $(X_0, Y_0)$. The system may then identify and activate, at 1162, which of the antenna elements within the antenna pixel can be tuned to (or most closely approximate) the target phase value calculated for the center of the antenna pixel. The evaluation process is completed for each of the antenna pixels sequentially or in parallel.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. As used herein, all references to number ranges in the description and claims are intended to be inclusive of the bounding numbers, unless explicitly stated otherwise. For example, a range described as being between 1 and 10 is understood to encompass all numbers from 1 to 10, including the numbers 1 and 10. Various benefits, advantages, or solutions to problems may be described above with regard to the various embodiments. However, benefits, advantages, solutions to problems, and any element(s) that may cause any benefit, advantage, or solution to occur or become more pronounced are not to be construed as a critical, required, or essential feature or element. This disclosure should, therefore, be determined to encompass at least the following claims and permutations thereof.

What is claimed is:

1. A reconfigurable antenna, comprising:

a plurality of antenna pixels, wherein each antenna pixel includes:

a waveguide with a relative permittivity to provide a target phase advance of P degrees across a length, L, thereof for an operational wavelength; and a set of N phase-adjustable antenna elements electromagnetically coupled to the waveguide at locations selected to associate each respective antenna element in the set of antenna elements with a distinct phase advance value between 0 and P degrees, wherein the number of antenna elements, N, and the spacing between adjacent antenna elements along the waveguide are selected to provide each antenna pixel with a combined phase-response greater than a phase adjustability of a single phase-adjustable antenna element.

2. The antenna of claim 1, further comprising control lines for connecting the N phase-adjustable antenna elements of each antenna pixel to a beamforming controller.

3. The antenna of claim 2, wherein the N antenna elements of each respective antenna pixel have interelement spacings corresponding to incremental phase advances of P/N degrees.

4. The antenna of claim 3, wherein each of the N antenna elements in each respective antenna pixel is phase-adjustable between −P/(2N) degrees and +P/(2N) degrees.

5. The antenna of claim 4, wherein the target phase advance, P, is 360 degrees.

6. The antenna of claim 4, wherein the target phase advance, P, is less than 360 degrees.

7. The antenna of claim 2, wherein the N antenna elements of each respective antenna pixel have interelement spacings corresponding to equidistant phase advance values.

8. The antenna of claim 7, wherein each of the N antenna elements in each respective antenna pixel has a phase adjustability that is less than one-half of the phase advance of the waveguide between adjacent antenna elements.

9. The antenna of claim 2, further comprising:

a beamforming controller operable to:

identify a target phase value for each antenna pixel to attain an antenna phase pattern corresponding to a target beamform, activate, in each set of antenna elements in each antenna pixel, an antenna element identified as having a combined phase advance and phase adjustability closest to the target phase value of each respective antenna pixel, and adjust a phase of each activated antenna element to approximate the identified target phase value for each respective antenna pixel.

10. The antenna of claim 9, wherein the distance between adjacent antenna elements in each respective antenna pixel corresponds to a phase advance value of P/N, and wherein each of the N antenna elements in each respective antenna pixel has a total phase adjustability that is less than P/N.

11. The antenna of claim 10, wherein the target phase advance across the length of the waveguide of each respective antenna pixel is at least 270 degrees, wherein four phase-adjustable antenna elements are coupled to the waveguide of each antenna pixel, where each antenna pixel has a maximum tunability of 240 degrees, wherein the four antenna elements in each antenna pixel are spaced along the length of each respective waveguide to have relative phase advance values of 0 degrees, 90 degrees, 180 degrees, and 270 degrees, and wherein each of the four antenna elements is phase-adjustable between −30 degrees and 30 degrees, such that:

a first of the four antenna elements has the relative phase advance of 0 degrees and is phase-adjustable between 330 degrees and 30 degrees, a second of the four antenna elements has the relative phase advance of 90 degrees and is phase-adjustable between 60 degrees and 120 degrees, a third of the four antenna elements has the relative phase advance of 180 degrees and is phase-adjustable between 150 degrees and 210 degrees, and a fourth of the four antenna elements has the relative phase advance of 270 degrees and is phase-adjustable between 240 degrees and 300 degrees.

12. The antenna of claim 1, wherein the antenna elements coupled to the waveguide of each respective antenna pixel extend from the waveguide in alternating directions.

13. An antenna pixel, comprising:

a waveguide having a relative permittivity to provide a phase advance across a length thereof, for an operational wavelength, and a set of N phase adjustable antenna elements electromagnetically coupled to the waveguide at coupling locations selected to associate each respective antenna element with a distinct phase advance value along the length of the waveguide based on the relative permittivity thereof, where N is an integer value.

14. The antenna pixel of claim 13, wherein each phase-adjustable antenna element is adjustable between −360/(2N) degrees and 360/(2N) degrees.

15. The antenna pixel of claim 14, wherein the relative permittivity of the waveguide and the coupling location of each respective antenna element are selected such that the difference in the phase advance value of any two antenna elements is at least 360/N.

16. The antenna pixel of claim 13, wherein each antenna pixel has length and width dimensions that are less than one-half of an operational wavelength.

17. The antenna pixel of claim 13, wherein the waveguide is characterized as being at least one of: a low-loss stripline, a metal stripline, and an RF-4 substrate.

18. The antenna pixel of claim 13, wherein each antenna element comprises a subwavelength cavity with an iris-coupled patch with a voltage-controlled diode.

19. The antenna pixel of claim 13, wherein each antenna element is phase-adjustable between −45 degrees and 45 degrees.

20. The antenna pixel of claim 13, further comprising control lines for connecting the N phase-adjustable antenna elements to a controller.

21. The antenna pixel of claim 13, wherein the N antenna elements of each respective antenna pixel have interelement spacings corresponding to incremental phase advances of P/N degrees.

22. The antenna pixel of claim 21, wherein each of the N antenna elements in each respective antenna pixel is phase-adjustable between −P/(2N) degrees and +P/(2N) degrees.

23. The antenna of claim 22, wherein the target phase advance, P, is equal to or less than 360 degrees.

24. A reconfigurable antenna, comprising:

a plurality of antenna pixels, wherein each antenna pixel includes:

a waveguide with a length, L, and a relative permittivity to provide a phase advance of at least 90 degrees across a distance of one-eighth of an operational wavelength to provide a target phase advance of P degrees across the length, L, thereof for the operational wavelength, where P is at least 270 degrees, and a set of N phase-adjustable antenna elements electromagnetically coupled to the waveguide with interelement spacings selected to associate each antenna element in the set of antenna elements with a distinct phase advance value of P/N degrees, where N is an integer value; and a beamforming controller to:

identify a target phase value for each antenna pixel to attain an antenna phase pattern corresponding to a target beamform, activate, in each set of antenna elements in each antenna pixel, an antenna element identified as having a phase advance closest to the target phase value of each respective antenna pixel, and adjust a phase of each activated antenna element to correspond to the identified target phase value for each respective antenna pixel.

* * * * *